United States Patent
Barsness et al.

(10) Patent No.: US 11,210,298 B2
(45) Date of Patent: *Dec. 28, 2021

(54) REDUCING FLOW DELAYS IN A DATA STREAMING APPLICATION CAUSED BY LOOKUP OPERATIONS

(71) Applicant: International Business Machines Corporation, Armonk, NY (US)

(72) Inventors: Eric L. Barsness, Pine Island, MN (US); Daniel E. Beuch, Rochester, MN (US); Michael J. Branson, Rochester, MN (US); John M. Santosuosso, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 16/514,728

(22) Filed: Jul. 17, 2019

(65) Prior Publication Data

US 2019/0340180 A1 Nov. 7, 2019

Related U.S. Application Data

(63) Continuation of application No. 15/406,296, filed on Jan. 13, 2017, now Pat. No. 10,417,239.

(51) Int. Cl.
*G06F 16/2453* (2019.01)
*G06F 16/2455* (2019.01)
(Continued)

(52) U.S. Cl.
CPC .... *G06F 16/24575* (2019.01); *G06F 16/2462* (2019.01); *G06F 16/24542* (2019.01); *G06F 16/24568* (2019.01); *G06F 16/9535* (2019.01)

(58) Field of Classification Search
CPC ......... G06F 16/24575; G06F 16/24542; G06F 16/24568; G06F 16/9535; G06F 16/2462; G06F 16/9536; G06F 16/9538
See application file for complete search history.

(56) References Cited

U.S. PATENT DOCUMENTS 5,913,912 A 6/1999 Nishimura et al.
6,353,821 B1 3/2002 Gray
(Continued)

FOREIGN PATENT DOCUMENTS

JP 2010204880 A 9/2010
JP 2014229044 A 12/2014
(Continued)

OTHER PUBLICATIONS

Avnur et al., "Eddies: Continuously Adaptive Query Processing", ACM SIGMOD Record vol. 29, No. 2, ACM, 2000.
(Continued)

*Primary Examiner* — Jorge A Casanova
(74) *Attorney, Agent, or Firm* — Cantor Colburn LLP; Nathan Rau

(57) ABSTRACT

Profiling data characterizing a data streaming application is used to predict data which will need to be retrieved by a processing element during execution of the data streaming application. Data is retrieved responsive to the prediction, in advance of actual demand by the processing element which requires it. Prediction may be based at least in part on upstream tuple contents, and could include other historical data retrieval patterns. In some embodiments, retrieval of predicted data may be delayed so that data is retrieved just in time.

13 Claims, 14 Drawing Sheets

(51) Int. Cl.
*G06F 16/2457* (2019.01)
*G06F 16/2458* (2019.01)
*G06F 16/9535* (2019.01)

(56) References Cited

U.S. PATENT DOCUMENTS

| | | |
|---|---|---|
| 7,774,336 B2 | 8/2010 | Beyer et al. |
| 7,849,227 B2 | 12/2010 | Kashiyama et al. |
| 8,533,730 B2 | 9/2013 | Shinichi |
| 8,886,822 B2 | 11/2014 | Pedersen et al. |
| 8,959,313 B2 | 2/2015 | Santosuosso et al. |
| 8,990,416 B2 | 3/2015 | Shukla et al. |
| 9,253,058 B2 | 2/2016 | Branson et al. |
| 9,286,352 B2 | 3/2016 | Park et al. |
| 9,298,848 B2 | 3/2016 | Cao et al. |
| 9,836,467 B1 | 12/2017 | Barsness et al. |
| 10,025,826 B2 | 7/2018 | Barsness et al. |
| 10,127,283 B2 | 11/2018 | Barsness et al. |
| 2007/0136254 A1 | 6/2007 | Choi et al. |
| 2007/0288459 A1 | 12/2007 | Kashiyama et al. |
| 2010/0204880 A1 | 8/2010 | Von Oheimb |
| 2011/0064079 A1 | 3/2011 | Lim et al. |
| 2011/0239048 A1 | 9/2011 | Andrade et al. |
| 2012/0047505 A1 | 2/2012 | Branson et al. |
| 2013/0091123 A1 | 4/2013 | Chen et al. |
| 2014/0136175 A1 | 5/2014 | Branson et al. |
| 2014/0136176 A1 | 5/2014 | Branson et al. |
| 2015/0127671 A1 | 5/2015 | Cao et al. |
| 2015/0142952 A1 | 5/2015 | Bragstad et al. |
| 2015/0158757 A1 | 6/2015 | Amma |
| 2016/0048565 A1 | 2/2016 | Cammert et al. |
| 2018/0203904 A1 | 7/2018 | Barsness et al. |
| 2018/0203906 A1 | 7/2018 | Barsness et al. |
| 2019/0018882 A1* | 1/2019 | Branson ............ G06F 16/24542 |
| 2019/0216753 A1 | 7/2019 | Wang et al. |

FOREIGN PATENT DOCUMENTS

| | | |
|---|---|---|
| JP | 2015158757 A | 9/2015 |
| JP | 2019530749 A | 10/2019 |
| WO | 2013113575 A1 | 8/2013 |

OTHER PUBLICATIONS

Babu et al., "Adaptive Ordering of Pipelined Stream Filters", ACM SIGMOD 2004 Jun. 13-18, 2004, Paris, France.

Deshpande et al., "Adaptive Query Processing", Foundations and Trends in Databases, vol. 1, No. 1 (2007), pp. 1-140.

Golab et al., "Issues in Data Stream Management", ACM SIGMOD Record, vol. 32, No. 2, Jun. 2003.

Tian et al., "Tuple Routing Strategies for Distributed Eddies", Proceedings fo the 29th International Conference on Very Large Databases, vol. 29, Berlin, Germany, VLDB Endowment, 2003.

International Business Machines Corporation, "List of IBM Patents or Patent Applications Treated as Related", filed in USPTO in present application herewith.

International Search Report; International Application No. PCT/EP2017/081297; International Filing Date Apr. 12, 2017; dated Jan. 3, 2018; 11 pages.

* cited by examiner

REDUCING FLOW DELAYS IN A DATA STREAMING APPLICATION CAUSED BY LOOKUP OPERATIONS

CROSS-REFERENCE TO RELATED APPLICATIONS

This application is a continuation of copending U.S. patent application Ser. No. 15/406,296, filed Jan. 13, 2017, entitled "Reducing Flow Delays in a Data Streaming Application Caused By Lookup Operations", which is herein incorporated by reference.

This application is also related to copending U.S. patent application Ser. No. 15/798,773, filed Oct. 31, 2017, entitled "Reducing Flow Delays in a Data Streaming Application Caused by Lookup Operations", which is herein incorporated by reference.

FIELD

This disclosure generally relates to stream computing, and in particular, to computing applications that receive streaming data and process the data as it is received.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Modern computer systems may be used to support a variety of applications, but one common use is the maintenance of large relational databases, from which information may be obtained. A large relational database is often accessible to multiple users via a network, any one of whom may query the database for information and/or update data in the database.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

Stream-based computing, also called data streaming, has been used to more effectively handle large volumes of incoming data in real time. In a data streaming application, data moves through a connected network of "processing elements" called a "graph", each processing element performing some function or functions with respect to the data.

Stream-based computing works on a paradigm in which all the data is live as it moves through the operator graph. In accordance with this paradigm, each processing element in the graph has all the data needed to perform its function at hand, and can do so sufficiently rapidly to maintain a high rate of data flow through the graph. However, a processing element sometimes needs to access data externally, i.e., either in storage or a remote database, an event sometimes referred to as a lookup operation. When this happens, the processing element must wait while the necessary data is retrieved. Such waits can substantially degrade the performance of the streaming application. Often, the wait has a ripple effect through the operator graph, causing other processing elements to wait unnecessarily for data and/or data to back up in various buffers of the stream application.

A need exists for improved techniques for managing large data flows, and in particular, for improved data streaming techniques which manage data lookup operations.

SUMMARY

Profiling data collected from one or more previous time intervals during a current and/or one or more previous execution instances of a data streaming application is used to predict data which will need to be retrieved by a processing element in a current execution instance of the data streaming application. Data is retrieved responsive to the prediction, in advance of actual demand by the processing element which requires it.

In one or more embodiments, prediction is based at least in part on upstream tuple contents. i.e., a particular set of values within a tuple encountered in the data streaming graph upstream of the subject processing element may be used to predict a later need for certain data by the subject processing element, e.g., when the tuple reaches the subject processing element. In one or more embodiments, prediction is based at least in part on historical data retrieval patterns of the data streaming application. Such historical patterns could include any or all of (a) time of day/week a data element is typically retrieved; (b) time after occurrence of a particular event; (c) existence of certain conditions; or (d) correlation with other data retrievals. In one or more embodiments, prediction of required data may include a predicted time the data is required, and retrieval of data which is predicted to be required may be delayed so that data is retrieved just in time.

Prediction of data required need not be perfect. If data predicted to be required is not in fact required, the data streaming application will continue to execute normally, and the only cost is the small overhead of retrieving the unused data. If data is in fact required but not predicted, it will be retrieved on demand of the processing element as in existing art. By predicting at least some data needed by one or more processing elements in a data streaming application and retrieving data into the processing element(s) in advance of demand by the processing element(s) for the data, idling or waiting for data by the processing element(s) is reduced, and efficiency of execution of the data streaming application is improved.

The details of the present invention, both as to its structure and operation, can best be understood in reference to the accompanying drawings, in which like reference numerals refer to like parts, and in which:

DETAILED DESCRIPTION

Streams Processing Overview

Figure 1:
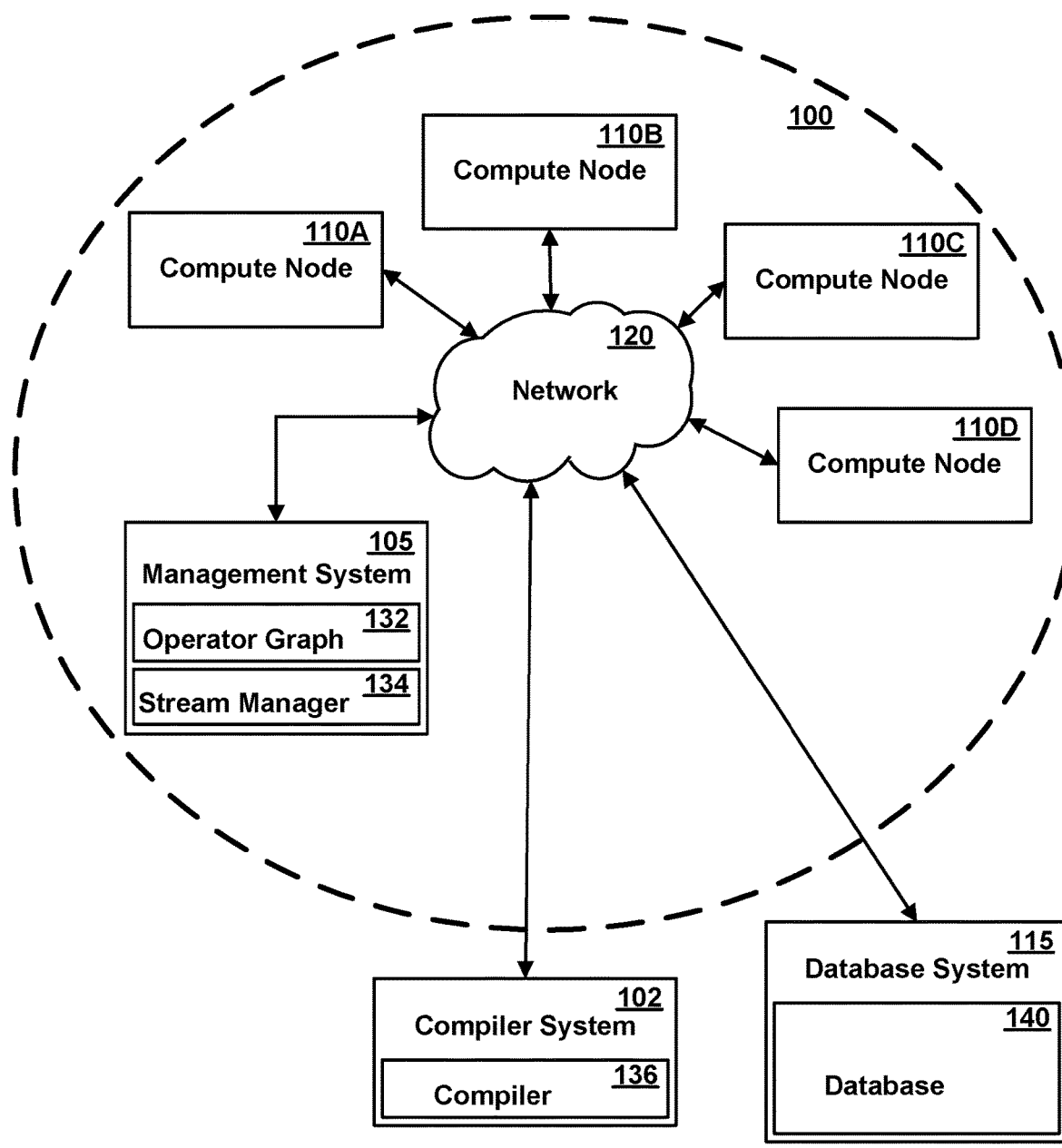
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may or may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

FIG. 1 illustrates one exemplary computing infrastructure 100 that may be configured to execute a stream computing application, according to some embodiments. The computing infrastructure 100 includes a management system 105 and two or more compute nodes 110A-110D (herein generically referred to as feature 110)—i.e., hosts—which are communicatively coupled to each other using one or more communications networks 120. The communications network 120 may include one or more servers, networks, or databases, and may use a particular communication protocol to transfer data among compute nodes 110. A compiler system 102 may be communicatively coupled with the management system 105 and the compute nodes 110 either directly or via the communications network 120. Additionally, a database system 115 containing a database 140 may be communicatively coupled to network 120 for communication with management system 105 and/or compute nodes 110.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Computer System Hardware Components

Figure 2:
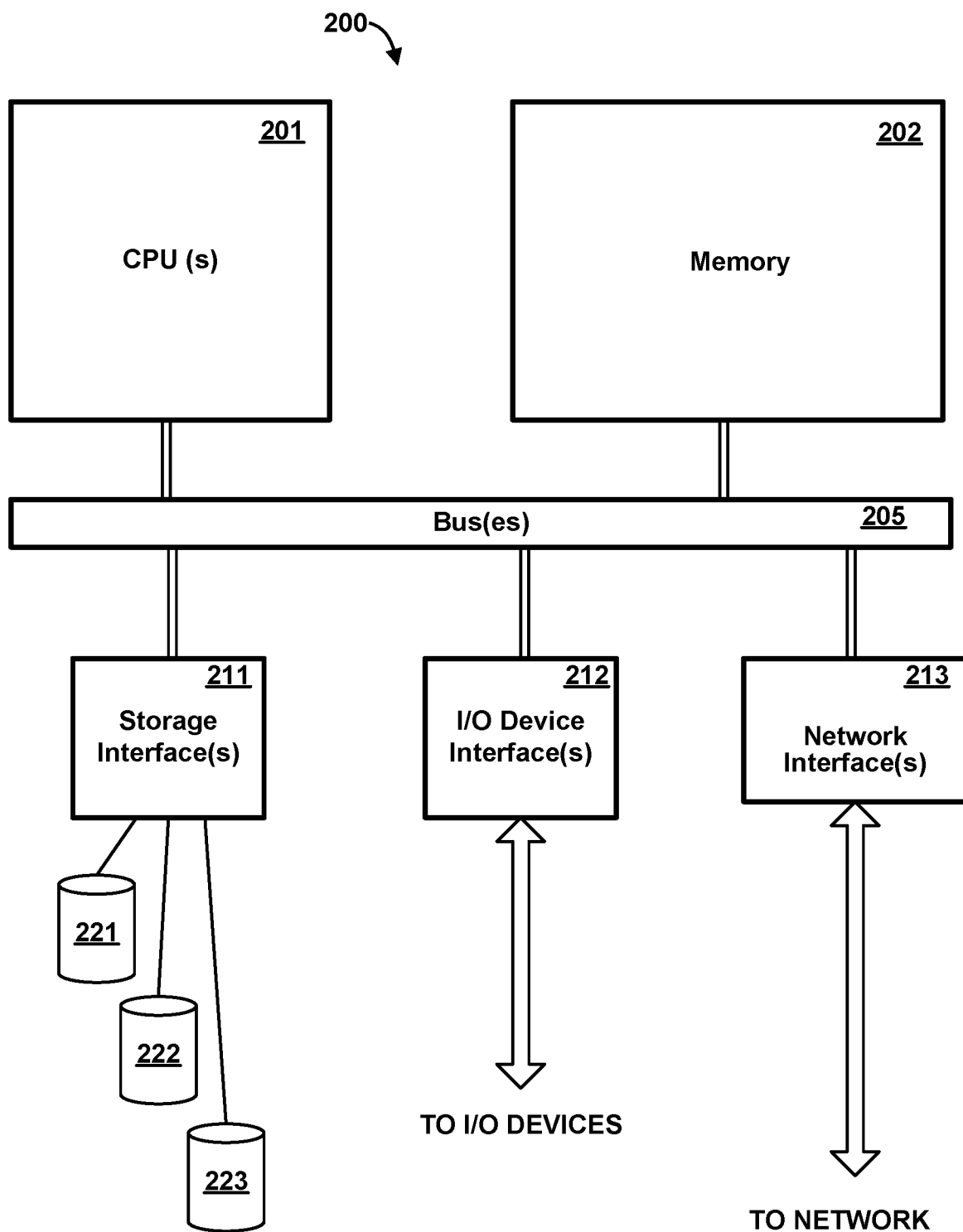
FIG. 2 is a high-level block diagram of the major hardware components of a representative general purpose computer system which could be used to perform the role of any of several functional elements, according to various embodiments.

FIG. 2 is a high-level block diagram of the major hardware components of a representative general purpose computer system 200. In one or more embodiments, compiler system 102, management system 105, compute nodes 110, and database system 115 are each physically embodied as respective one or more general purpose computer systems, system 200 being a representation of any such general purpose computer system.

Computer system 200 includes one or more general-purpose programmable processors (CPU) 201 which execute instructions and process data from main memory 202. Main memory 202 is preferably a volatile random access memory comprising at least one, and typically multiple, semiconductor integrated circuit chip modules, using any of various memory technologies, in which data is loaded from storage or otherwise for processing by CPU(s) 201.

One or more communications buses 205 provide a data communication path for transferring data among CPU(s) 201, main memory 202 and various interface units 211, 212, 213, which may also be known as I/O processors (IOPs) or I/O adapters (IOAs). The interface units support communication with a variety of storage, I/O devices, and/or networks. For example, storage interface unit(s) 211 supports the attachment of one or more storage devices 221-223 providing non-volatile storage of data which can be loaded into memory as required. Such storage devices may include well-known rotating magnetic hard disk drive storage devices, solid state devices (SSD), removable memory cards, optical storage, flash memory, and so forth, and could further include network attached storage (NAS), devices attached via a storage area network (SAN), and/or arrays of disk drives and/or other storage devices configured to appear as a single large storage device to a host. Storage may further include cloud storage devices accessible via one or more networks. I/O device interface unit(s) 212 may support the attachment of any of various other types of I/O devices, such as user terminals, displays, keyboards or other input devices, printers, and so forth, it being understood that other or additional types of I/O devices could be used. Network interface adapter(s) 213 may support connections to one or more external networks for communication with one or more other digital devices, and specifically to network 120 for communication with devices represented in FIG. 1. Network adapter(s) 213 could support redundant connections to a single network, or could be coupled to separate networks, which may or may not be in communication with each other. Such external networks preferably include the Internet, and may include one or more intermediate networks, such as local area networks, through which communication with the Internet is effected.

It should be understood that FIG. 2 is intended to depict the representative major components of general purpose computer system 200 at a high level, that individual components may have greater complexity than represented in FIG. 2, that components other than or in addition to those shown in FIG. 2 may be present, that the number, type and configuration of such components may vary, and that a complex computer system will typically have more components than represented in FIG. 2. Several particular examples of such additional complexity or additional variations are disclosed herein, it being understood that these are by way of example only and are not necessarily the only such variations.

Although only a single CPU 201 is shown for illustrative purposes in FIG. 2, computer system 200 may contain multiple CPUs, as is known in the art. Although main memory 202 is shown in FIG. 2 as a single monolithic entity, memory 202 may in fact be distributed and/or hierarchical, as is known in the art. For example, memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures Although communications buses 205 are shown in FIG. 2 as a single entity, in fact communications among various system components is typically accomplished through a complex hierarchy of buses, interfaces, and so forth, in which higher-speed paths are used for communications between CPU(s) 201 and memory 202, and lower speed paths are used for communications with I/O interface units 211-213. Buses 205 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 205 from various communications paths running to the various I/O devices, it would alternatively be possible to connect some or all of the I/O devices directly to one or more system buses. Although FIG. 1 represents network 120 as a single entity, in one or more embodiments a separate network or storage bus may be present for communicating with one or more shared storage servers, and such communication may be driven by a dedicated one or more storage interface units 211 separate from general purpose network adapters 213.

Computer system 200 depicted in FIG. 2 may include multiple attached terminals, such as might be typical of a multi-user "mainframe" computer system. Where computer system 200 is used exclusively as a compute node 110 or other server for performing work on behalf of remote clients, it may contain only a limited number of terminals, or even a single terminal, e.g., for use as a maintenance interface by a system administrator or the like, or in some cases no terminal at all, administrative functions being performed remotely. Furthermore, while certain functions are described herein for illustrative purposes as embodied in a single computer system, some or all of these functions could alternatively be implemented using a distributed network of computer systems in communication with one another, in which different functions or steps described herein are performed on different computer systems.

Although compute nodes 110, management system 105, compiler system 102, and database system 115 are represented in FIGS. 1-2 as independent systems, any or all of these entities may be implemented as corresponding logical partitions of one or more logically partitioned computer systems. For example, any of CPUs 201 may in fact be a corresponding portion of a processing resource capacity of a larger logically partitioned computer system which is allocated to the corresponding logical partition; and any memory 202 may in fact be a corresponding portion of a memory capacity of a larger logically partitioned computer system which is allocated to the corresponding logical partition.

While various system components have been described and shown at a high level, it should be understood that a typical computer system contains many other components not shown, which are not essential to an understanding of the present invention.

Stream Computing Components

Figure 3:
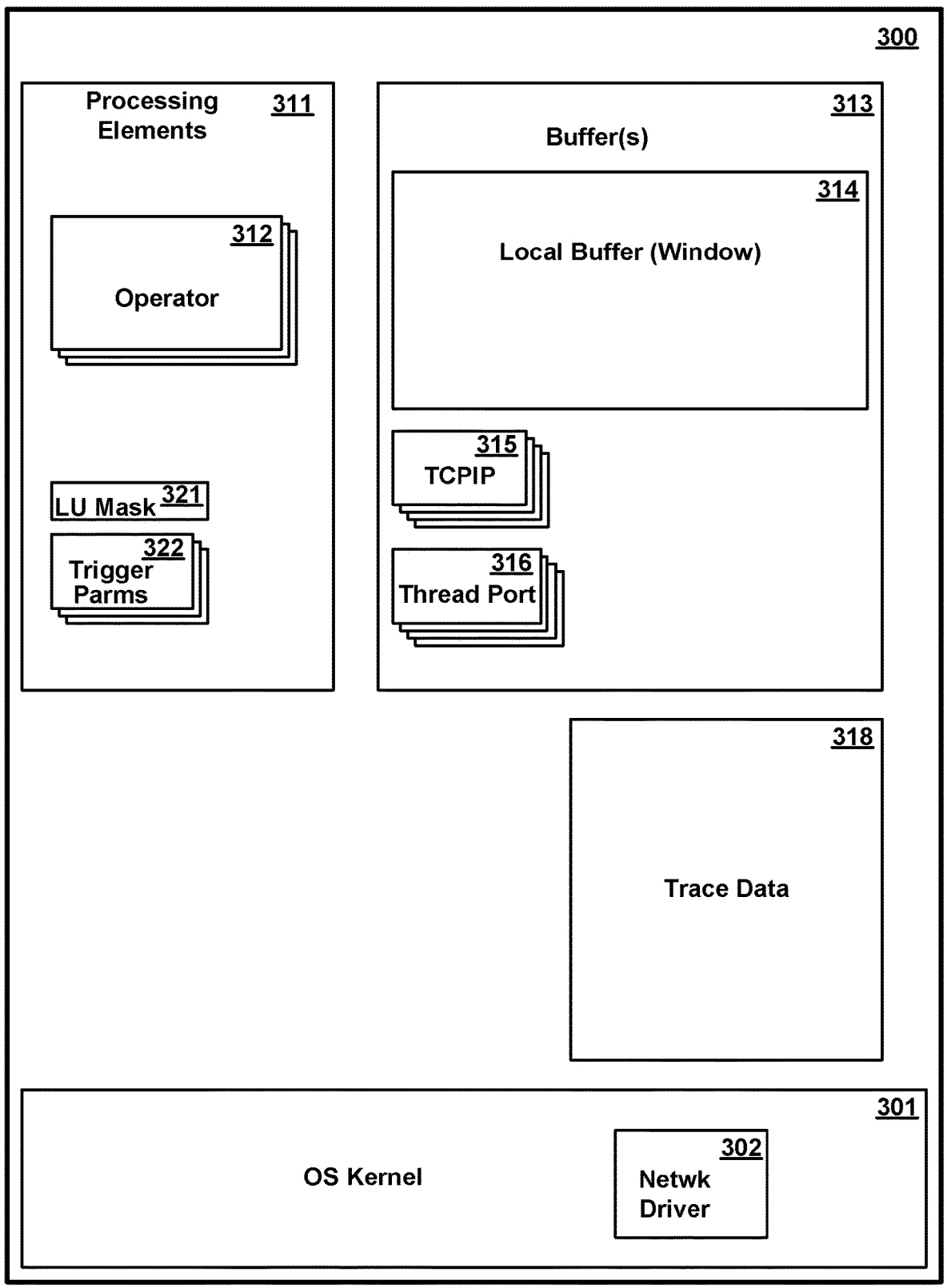
FIG. 3 is a conceptual illustration of certain software components in memory of a compute node of FIG. 1, according to various embodiments.

FIG. 3 is a conceptual illustration showing in greater detail certain software components in memory 300 of a compute node 110, which may be the same as one of the compute nodes 110A-110D of FIG. 1, according to various embodiments. As shown in FIG. 3, a representative compute node memory includes an operating system kernel 301, one or more processing elements 311, and a buffer 313.

Operating system kernel 301 is executable code and state data providing various low-level software functions, such as device interfaces, management of memory pages, management and dispatching of multiple tasks, common services for application programs, etc. as is well known in the art. In particular, OS kernel 301 preferably includes one or more network adapter drivers 302 for handling communications with one or more networks, including network 120, via network interface(s) 213.

The one or more processing elements 311 each comprise code and state data for performing respective functions as part of a data stream computing application. A stream computing application may include one or more stream operators 312 that may be compiled into a "processing element" container 311. The memory 300 may include two or more processing elements 311, each processing element having one or more stream operators 312. Each stream operator 312 may include a portion of code that processes tuples flowing into a processing element and outputs tuples to other stream operators 312 in the same processing element, in other processing elements, or in both the same and other processing elements in a stream computing application. Processing elements 311 may pass tuples to other processing elements that are on the same compute node 110 or on other compute nodes that are accessible via communications network 120. For example, a processing element 311 on compute node 110A may output tuples to a processing element 311 on compute node 110B. In one embodiment, a processing element 311 is assigned to be executed by only one CPU, although in other embodiments the stream operators 312 of a processing element 311 may include multiple threads which may be executed on different respective CPUs.

Buffer 313 is a portion of memory 300 for holding data being streamed as part of the stream computing application, and in particular, for holding data tuples. Buffer 313 may be a single entity, but in one or more embodiments, multiple buffers exist including a local buffer 314 also known as a window, one or more TCPIP buffers 315 for passing messages among various entities of the data streaming applications, and one or more thread ports 316 for queuing data to be processed be respective one or more threads.

Figure 4:
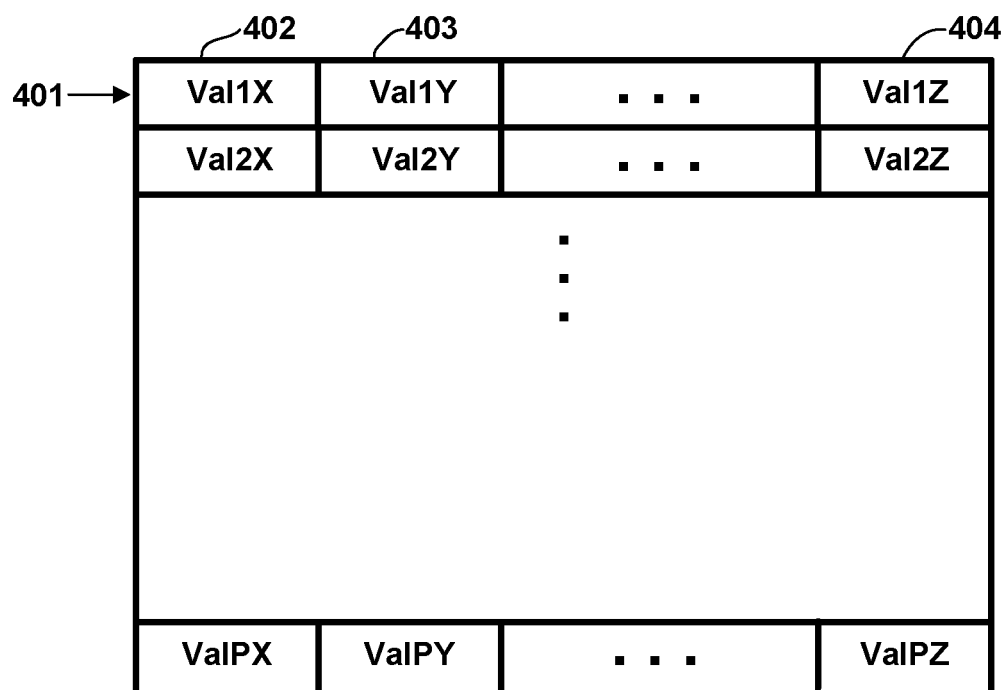
FIG. 4 is a conceptual representation of a set of tuples in a streaming data application buffer, according to various embodiments.

FIG. 4 is a conceptual representation of a set of tuples in a streaming data application buffer 313, according to various embodiments. Any of buffers 314-316 may hold one or more tuples. As illustrated in FIG. 4, a set of tuples contains one or more tuples 401, each tuple logically organized as multiple fields or attributes 402-404. A set of tuples may be conceptually represented as a table, in which each tuple 401 corresponds to a respective row of the table, and each attribute or field of a tuple corresponds to a respective column of the table. Although conceptually represented as a table, the actual structure of a set of tuples in memory may vary, and may be different in each of the different buffers 314-316; the set may occupy non-contiguous memory address regions, tuples may vary in size; some attributes might be present in only a subset of the tuples, and so forth. Although in various embodiments the data streaming application produces tuples which are added to a table of a database, the structure and attributes of tuples 401 within the data streaming application are not necessarily identical to those of tuples in a table of a relational database. The tuples 401 stored in buffer 313 may be all of a single type (i.e., all have the same attributes and structure), or may be tuples of different types. In one or more embodiments, tuples may be grouped separately in separate sets or in different buffers depending on current status of a tuple within the operator graph. For example, one set of tuples may comprise tuples 401 awaiting processing by a particular processing element 311 within the compute node while another set comprises tuples 401 which have already been processed by the particular processing element In one or more embodiments, compute node memory 300 may further include trace data 318 tracing operation of the data streaming application, and particularly tracing the progression of tuples through the operator graph. This trace data may be used to build operator graph profile data for use in projecting downstream data lookup operations within the operator graph.

In one or more embodiments, state data in processing elements 311 further includes a lookup mask 321 and one or more trigger parameter datasets 322. Lookup mask 321 is a bit mask or similar structure indicating, for each of one or more processing elements, operators, or other code portions which may trigger anticipatory lookup operation in response to detecting an anteceding lookup predictive event, whether anticipatory lookup is enabled. Trigger parameter datasets 322 comprises one or more datasets, each corresponding to a respective processing element, operator, or other location, which contains parameters governing triggering the lookup event and the consequent lookup event itself. The usage of the lookup mask 321 and trigger parameter datasets 322 during execution of the data streaming application is described in greater detail herein.

Figure 5:
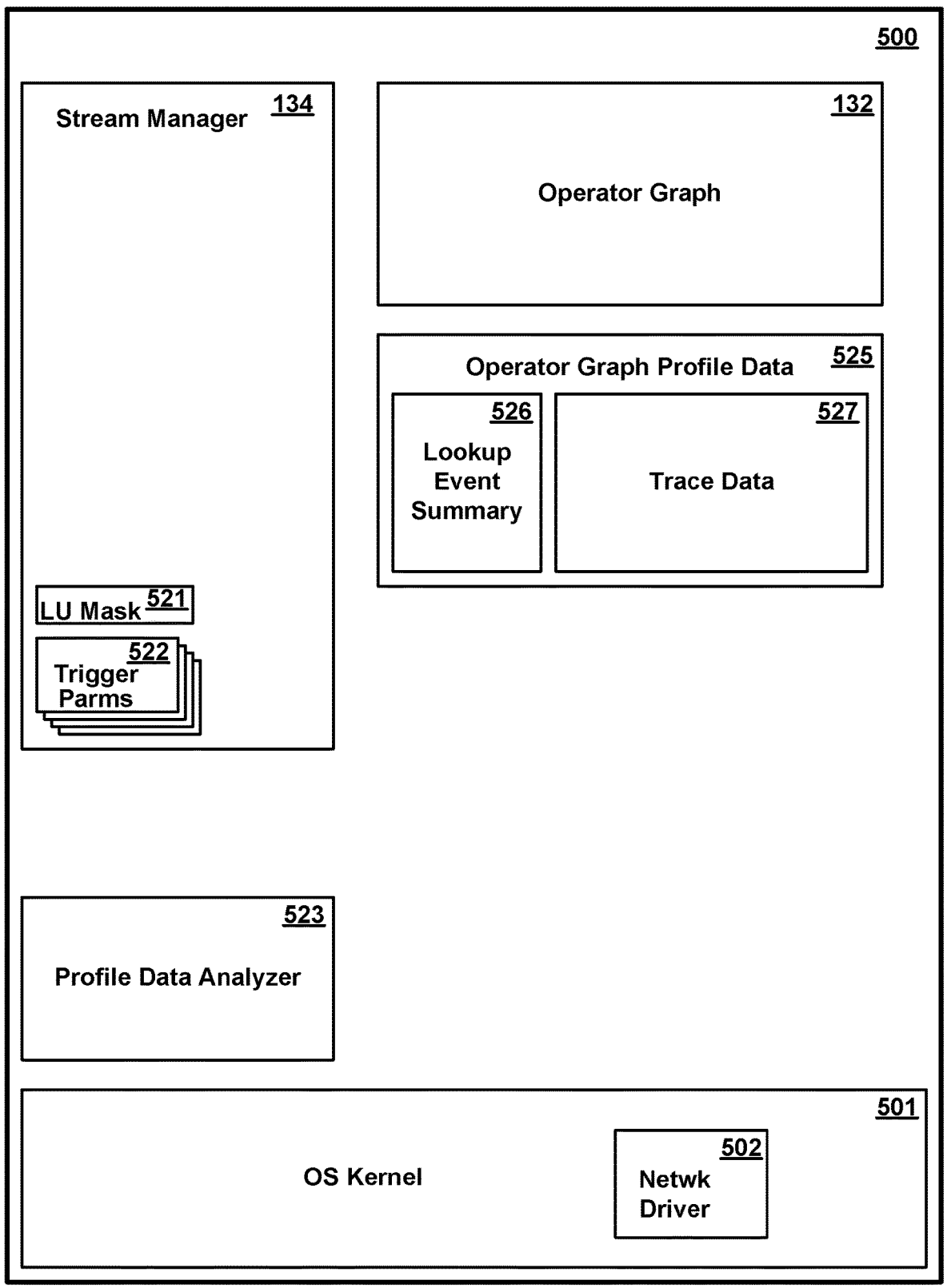
FIG. 5 is a conceptual illustration of certain software components in memory of the management system of FIG. 1 according to various embodiments.

FIG. 5 is a conceptual illustration showing in greater detail certain software components in memory 500 of the management system 105 of FIG. 1 according to various embodiments. As shown in FIG. 5, a representative management system memory includes an operating system kernel 501, a stream manager 134, an operator graph 136, a profile data analyzer 523, and operator graph profile data 525.

Operating system kernel 501 is executable code and state data providing various low-level software functions, such as device interfaces, management of memory pages, management and dispatching of multiple tasks, common services for application programs, etc. as is well known in the art. In particular, OS kernel 501 preferably includes one or more network adapter drivers 502 for handling communications with one or more networks, including network 120, via network interface(s) 213.

Stream manager 134 manages the operation of the data streaming application, and in particular, maintains operator graph 132. Operator graph 132 is a data structure defining how tuples are routed to processing elements 311 for processing.

In one or more embodiments, state data in stream manager further includes a lookup mask 521 and one or more trigger parameter datasets 522. This state data is similar to local copy of lookup mask 321 and local copies of trigger parameter datasets 322 in memory 300 of a compute node 110, but stream manager would have global state data for the entire data streaming application, whereas the local copies of this data in memory 300 of a compute node would generally hold only state data applicable to the processing elements within that compute node. The usage of the lookup mask 521 and trigger parameter datasets 522 during execution of the data streaming application is described in greater detail herein.

Figure 11:
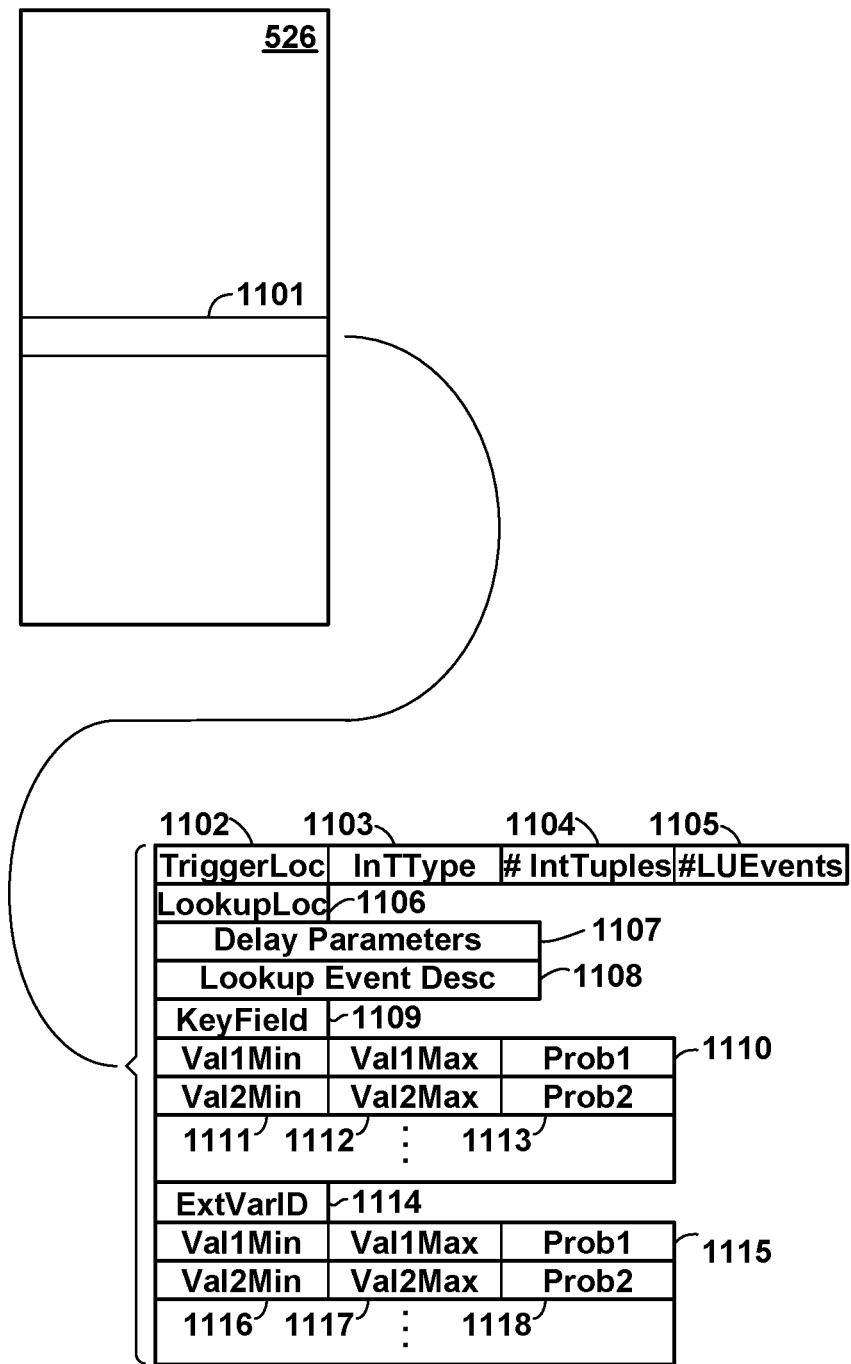
FIG. 11 is a conceptual illustration of the structure of an exemplary set of lookup event summary records, according to various embodiments.

Profile data analyzer 523 is executable code and state data which collects trace data from the various compute nodes and analyzes that data to construct and maintain operator graph profile data 525. Operator graph profile data 525 includes lookup event summary records 526 and trace data 527. Trace data 527 is a collection of all or selective portions of trace data 318 from the various compute nodes, and is used to by profile data analyzer to generate lookup event summary records 526. Lookup event summary records are a representation of historical lookup event patterns. For example, lookup event summary records may summarize, for each of various antecedent lookup predictive events, a respective predicted subsequently occurring lookup event, and may optionally include a probability or probabilities associated with the respective antecedent event and/or measure of time delay between the antecedent event and the lookup event. The antecedent event may be a respective tuple of a particular type, which may have particular attribute values, occurring at a particular processing elements. Exemplary lookup event summary data 526 is illustrated in FIG. 11 and described in greater detail herein.

Figure 6:
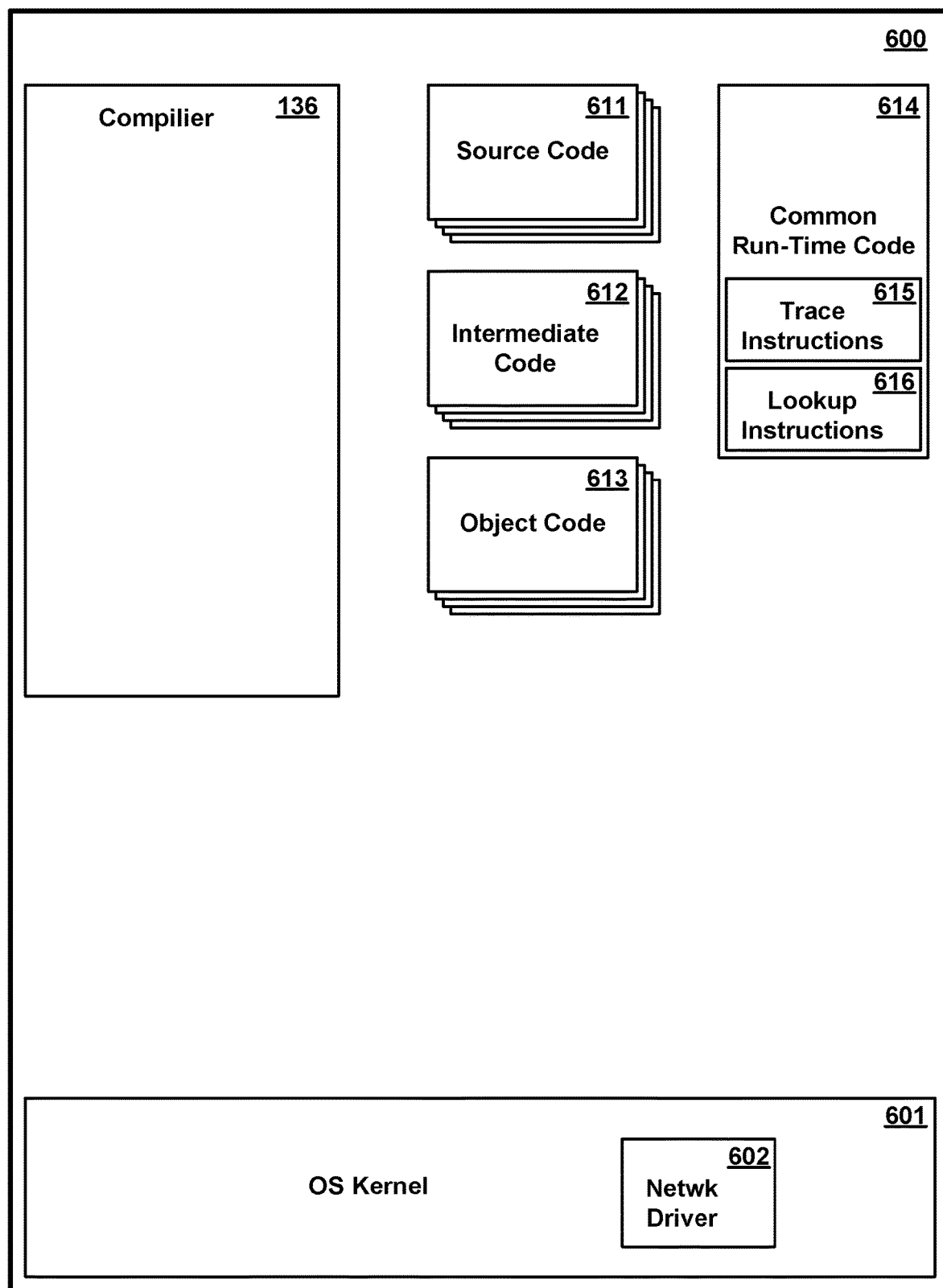
FIG. 6 is a conceptual illustration of certain software components in memory of the compiler system of FIG. 1 according to various embodiments.

FIG. 6 is a conceptual illustration showing in greater detail certain software components in memory 600 of the compiler system 102 of FIG. 1 according to various embodiments. As shown in FIG. 6, a representative compiler system memory includes an operating system kernel 601, a compiler 136, and compiler input and output in the form of source modules 611, intermediate code modules 612, and object code modules 613.

Operating system kernel 601 is executable code and state data providing various low-level software functions, such as device interfaces, management of memory pages, management and dispatching of multiple tasks, common services for application programs, etc. as is well known in the art. In particular, OS kernel 601 preferably includes one or more network adapter drivers 602 for handling communications with one or more networks, including network 120, via network interface(s) 213.

Compiler 136 is executable code and data structures which compiles modules, which include source code or statements 611, into the object code 613, which includes machine instructions that execute on a processor. In one embodiment, the compiler 136 may translate the modules into an intermediate form 612 before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, interprocedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Compiler system memory 600 further includes common run-time code 614. Common run-time code can be any of source code, intermediate code, or object code. Common run-time code 614 is common code which is included in the code of each processing element 311 to perform functions common to all or many processing elements. Common run-time code may include, for example, functions for passing messages among the various processing elements, accessing buffer 313, reporting errors or other status, and so forth. In one or more embodiments, common run-time code includes trace instructions 615 for collecting trace data 318 tracing operation of the data streaming application, and anticipatory lookup instructions 616 for initiating an anticipatory lookup operation responsive to a lookup predictive event. Trace data 318 collected by executing trace instructions 615 may be used for building operator graph profile data 525. Trace instructions 615 and/or anticipatory lookup instructions 616 may be optionally included instructions, i.e., instructions which the compiler 136 optionally includes in the code of a processing element depending on the settings or directions given to the compiler at time of compilation.

Figure 7:
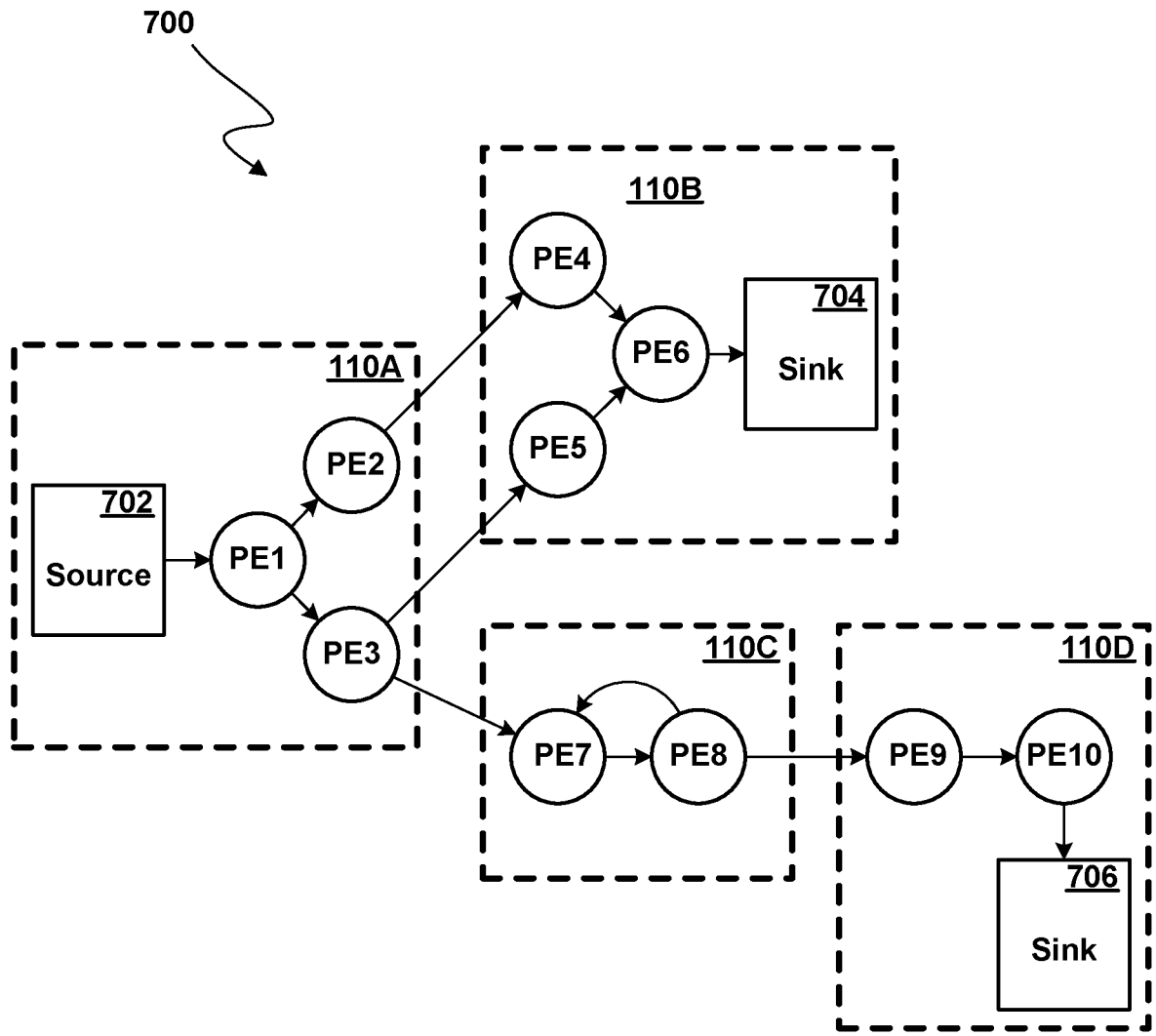
FIG. 7 illustrates an operator graph for a stream computing application according to various embodiments.

FIG. 7 illustrates an exemplary operator graph 700 for a stream computing application beginning from one or more sources 702 through to one or more sinks 704, 706, according to some embodiments. This flow from source to sink may also be generally referred to herein as an execution path. In addition, a flow from one processing element to another may be referred to as an execution path in various contexts. Although FIG. 7 is abstracted to show connected processing elements PE1-PE10, the operator graph 700 may include data flows between stream operators 312 (FIG. 3) within the same or different processing elements. Typically, processing elements, such as processing element 311 (FIG. 3), receive tuples from the stream as well as output tuples into the stream (except for a sink—where the stream terminates, or a source—where the stream begins). While the operator graph 700 includes a relatively small number of components, an operator graph may be much more complex and may include many individual operator graphs that may be statically or dynamically linked together.

The example operator graph shown in FIG. 7 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 700 begins at a source 702 and ends at a sink 704, 706. Compute node 110A includes the processing elements PE1, PE2, and PE3. Source 702 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 704. Similarly, tuples flowing from PE3 to PE5 also reach the operators in sink PE6 704. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 706. Typically, the sinks 704,706 output data (e.g. tuples) externally of the data streaming application (e.g., to a database, storage file, or other destination); however, it is possible for any of the processing elements to output data externally as well.

Processing elements 311 (FIG. 3) may be configured to receive or output tuples in various formats, e.g., the processing elements or stream operators could exchange data marked up as XML documents. Furthermore, each stream operator 312 within a processing element 311 may be configured to carry out any form of data processing functions on received tuples, including, for example, writing to database tables or performing other database operations such as data joins, splits, reads, etc., as well as performing other data analytic functions or operations.

The stream manager 134 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 7 illustrates execution paths between processing elements for the sake of clarity.

Database Components

Figure 8:
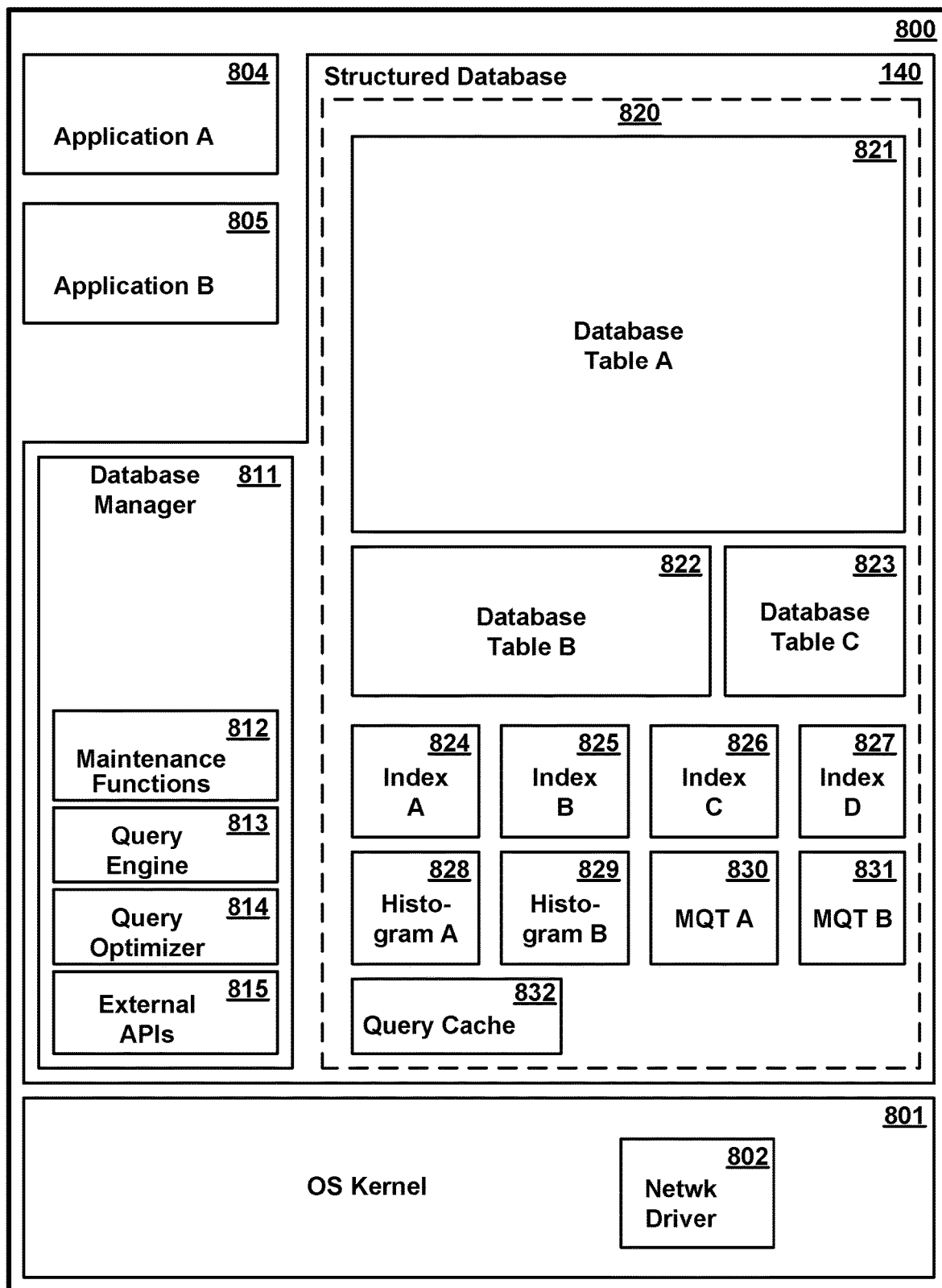
FIG. 8 is a conceptual illustration of the major software components in memory of a database server computer system, according to various embodiments.

In accordance with one or more embodiments, tuples output by operator graph 700, whether from one of sinks 704, 706, or from some other processing element, are entered into one or more tables of a structured relational database 140. FIG. 8 is a conceptual illustration of the major software components in memory 800 of a database server computer system 115 of FIG. 1 for accessing a structured relational database 140, according to various embodiments. As shown in FIG. 8, a database server computer system memory contains an operating system kernel 801 and structured database 140 including a database manager 811, one or more database tables 821-823, and one or more metadata structures 824-832.

Operating system kernel 801 is executable code and state data providing various low-level software functions, such as device interfaces, management of memory pages, management and dispatching of multiple tasks, common services for application programs, etc. as is well known in the art. In particular, OS kernel 801 preferably includes one or more network adapter drivers 802 for handling communications with one or more networks, including network 120, via network interface(s) 213.

Database tables and metadata 820 include one or more tables 821-823 (of which three are shown for illustrative purposes in FIG. 8, it being understood that the number may vary). As is known in the database art, a database table is a data structure logically in the form of a table having multiple records (also called entries or tuples), each record having at least one, and usually multiple, fields (also called attributes). The "rows" of the table correspond to the records, and the "columns" correspond to the fields. Although tables 821-823 are data structures which are logically equivalent to tables, they may be arranged in any suitable structure known in the database art. Database tables 821-823 might contain almost any type of data which is useful to users of a computer system.

Associated with the database tables are one or more auxiliary data structures 824-832, also sometimes referred to as metadata (of which nine are represented in FIG. 8, it being understood that the number and type of such structures may vary). Auxiliary data structures characterize the structure of the database and data therein, and are useful in various tasks involved in database management, particularly in executing queries against the database. Examples of auxiliary data structures include database indexes 824-827, histograms 828-829, and materialized query tables (MQT) 830-831). Auxiliary data structures may further include a query cache 832 in which data regarding previously executed queries (the query itself, query execution plan or execution strategy, run-time statistics from execution, etc.) is stored. Although a particular number and type of auxiliary database structures is illustrated in FIG. 8, it will be understood that the number and type of such structures may vary, that not all illustrated structures may be present, and/or that additional structures not shown may be present.

Database manager 811 comprises executable computer programming code which executes on CPU(s) 201 of database server system 115 to provide basic functions for the management of database 140. Database manager 811 may theoretically support an arbitrary number of database tables, which may or may not have related information, although only three tables are shown in FIG. 8. Database manager 811 preferably contains administrative maintenance functions 812 which automatically perform certain functions to manage the database and/or allow authorized users to perform basic administrative operations with respect to the database, such as defining and editing database table definitions, creating, editing and removing records in the database, viewing records in the database, defining database auxiliary data structures such as indexes and materialized query tables, views, and so forth. Administrative functions may further include logging of database transactions, recovery of data, and so forth. Certain of these functions may be available only to system administrators and the like, while others are available to clients.

Database manager 811 preferably further includes a query engine 813 for executing queries against data in database tables 821-823 and a query optimizer 814 for generating optimized query execution plans for use by query engine 813 in executing queries. Database manager 811 further preferably includes an external interface 815 having one or more application programming interfaces (APIs) by which external applications can access data in database 140 either by invoking query engine 813 or through other means. Database manager 811 may further contain any of various more advanced database functions, as are known in the art. Database manager could be a generic database management system, such as one implementing a structured query language (SQL) query protocol, but it might alternatively query and structure data according to some other protocol and/or might be a custom designed database management system. Although database manager 811 is shown and described herein as an entity separate from operating system kernel 801, it will be understood that in some computer architectures various database management functions are integrated with the operating system.

Although one database 140 having three database tables 821-823 and nine auxiliary structures 824-832 are shown in FIG. 8, the number of such entities may vary, and could be much larger. A computer system or a group of computer systems may contain multiple databases, each database may contain multiple tables, and each database may have associated with it multiple indexes, MQTs, histograms, views, volatility records, and/or other auxiliary data structures not illustrated. Alternatively, some entities represented in FIG. 8 might not be present in all databases. Additionally, database 140 may be logically part of a larger distributed database which is stored on multiple computer systems. Although database manager 811 is represented in FIG. 8 as part of database 140, the database manager, being executable code, is sometimes considered an entity separate from the "database", i.e., the data 820.

In addition to operating system 801 and database 140, memory of database system 800 may include all or selective portions of one or more user applications 804-805. User applications 804-805 are applications which execute on CPU(s) 201, and may access data in database 140 to perform tasks on behalf of one or more users. Such user applications may include, e.g., sales transactions, inventory management, personnel records, accounting, code development and compilation, mail, calendaring, or any of thousands of user applications, and may be web-based (i.e., present web pages to a remote client for rendering in the client's browser) or provide some other form of user interface. Some of these applications may access database data in a read-only manner, while others have the ability to update data. There may be many different types of read or write database access tasks, each accessing different data or requesting different operations on the data. For example, one task may access data from a specific, known record, and optionally update it, while another task may invoke a query, in which all records in the database are matched to some specified search criteria, data from the matched records being returned, and optionally updated. Furthermore, data may be read from or written to database tables 811-813 directly, or may require manipulation or combination with other data supplied by a user, obtained from another database, or some other source. Applications 804-805 typically utilize function calls to database manager 811 through external APIs 815 to access data in the database, and in particular, to execute queries against data in the database, although in some systems it may be possible to independently access data in the database directly from the application. Although two applications 804-805 are shown for illustrative purposes in FIG. 8, the number of such applications may vary.

Various software entities are represented conceptually in FIGS. 3-8 as being contained in respective memories of any of the various systems or devices described herein. However, as is well known, the memory of a computer or other digital device is typically insufficient to hold all software entities and other data simultaneously, and selective portions of software entities or other data are typically loaded into memory from storage as required. Furthermore, various software entities are represented in FIGS. 3-8 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIGS. 3-8, it will be understood that the actual number of such entities may vary, and in particular, that in a complex data streaming and/or database environment, the number and complexity of such entities is typically much larger. Additionally, although certain software components are depicted in within respective single systems for completeness of the representation, it is not necessarily true that all programs, functions and data will be present in a single system, and may be present in another partition on the same computer system or in a different computer system. For example, user applications 804-805 which call APIs to access the database may be on a separate system from certain maintenance functions such as defining the database, adding or deleting metadata structures, and so forth. Finally, it will be understood that the conceptual representations of FIGS. 3-8 are not meant to imply any particular memory organizational model, and that a computer system hosting a data streaming application or a database might employ a single address space virtual memory, or might employ multiple virtual address spaces which overlap.

Collection of Data Streaming Profile Data

In accordance with one or more embodiments, profile data is collected which characterizes the operation of the data streaming application. This profile data is then used to correlate instances of external data retrieval (lookup events) by a processing element in the operator graph with previously occurring events/conditions (antecedent lookup predictive events). In particular, in accordance with one or more embodiments, these antecedent events include particular data within a tuple upstream of the processing element which causes the external data retrieval. The antecedent events may also include particular values of external state variables, such as a time of day/day of week and so forth. These antecedent events can then used to predict that processing element will subsequently need to retrieve data. I.e., during subsequent execution of the data streaming application, occurrence of the antecedent events associated with later need for particular external data will cause the external data to be retrieved in advance of actual demand for it by the processing element which requires it.

In one or more embodiments, profile data is obtained by tracing the execution of one or more execution instances of the data streaming application, although other or additional forms of profile data might be used, such as input and output data or data obtained from analysis of the source code. Tracing is a well-known technique whereby the occurrence of pre-defined traceable events during execution of a computer program causes the computer to save certain state data showing the state of the computer at the time the traceable event occurred. It is typically used during computer program code development, to debug errors, determine frequently used code paths, identify performance bottlenecks, and so forth.

Tracing may be accomplished by "instrumenting" the code to be traced, i.e., placing trace instructions ("instrumentation") at various code location which, when encountered during execution of the computer program, cause the desired state data to be saved. A trace instruction could cause data to be saves unconditionally (every time the instruction is encountered), or conditionally based on some state value(s). The exact mechanism whereby the state data is saved may vary. The tracing instrumentation could be in-line instructions in the code, or a call to a separate routine, or an instruction which triggers an interrupt.

In one or more embodiments, the trace instructions 615 (instrumentation) are contained in at least one version of the common run-time code 614 used by computer 136 to generate the data streaming program. There could, in fact, be multiple versions of the common run-time code, including one without any instrumentation. There could also be multiple different instrumented versions for collecting different types of profile data. Instrumentation in the common run-time code simplifies the process of developing a data streaming application by avoiding the need for developers of each different data streaming application to create their own instrumentation, and standardizes the collection and analysis of profile data.

The common run-time code 614 typically contains routines in which traceable events occur. Specifically, in one or more embodiments, common run-time code 614 will include routines for allocating a new tuple in the data streaming application, for sending a tuple from one processing element to a next processing element, for accessing data outside the data stream (which may include lookup events), and for outputting a tuple to the database. Additional routines which may be of interest in tracing tuples in accordance with one or more embodiments may include routines for copying or duplicating a tuple, for deleting a tuple, for changing the definition of a tuple (its fields, field lengths, etc.) and so forth. In one or more embodiments, any or all of these events might be traceable events which cause the collection of trace data, and appropriate instrumentation is placed in the corresponding routines which perform the operation.

Figure 9:
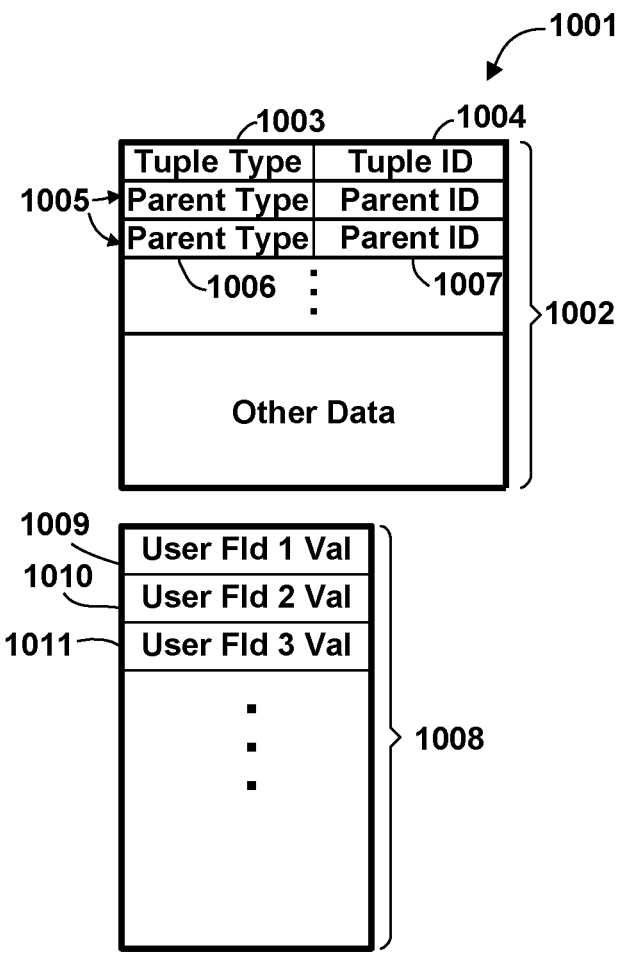
FIG. 9 is a conceptual representation of an altered tuple of a data streaming application altered for supporting profile analysis, according to various embodiments.

In one or more embodiments, the instrumented version(s) of common run-time code 614 alter the structure of the tuples used in the data streaming application by adding additional data useful in trace analysis. FIG. 9 is a conceptual representation of an altered tuple 901 of a data streaming application, altered for supporting profile analysis of trace data, according to various embodiments. Referring to FIG. 9, tuple 901 includes a header 902 containing a tuple type 903, a unique tuple identifier 904, and a variable number of parent pairs 905, each parent pair comprising a respective parent tuple type 906 and parent tuple identifier 907. The header may contain other data. The tuple further contains a body portion 908 having a variable number of user data fields 909-911 as defined by the data streaming application, of which three are illustrated in FIG. 9, it being understood that the number of such user data fields may vary. The tuple type 903 is the name of a set of tuples having a common defined structure, corresponding roughly to a table name of a database table containing multiple tuples (also called records or rows). The tuple identifier 904 and parent pairs 905 are additional fields which are added by the instrumented version of the common run-time code 614. These fields are used internally by the data streaming application for trace analysis and/or other purposes, and need not be visible to the user of the application.

In the instrumented version of the common run-time code, any routine which creates a new tuple automatically allocates the above described fields and assigns a unique tuple identifier 904, similar to a unique serial number, to the newly created tuple. If the newly created tuple is created from or copied from an existing tuple (parent tuple), the tuple type and unique tuple identifier of the parent tuple are copied into a parent pair 905 of the new tuple as the parent tuple type 906 and parent tuple identifier 907, respectively. Since there could be a chain of multiple parents, all parent pairs 905 in the immediate parent are also copied into respective parent pairs 905 of the newly created tuple.

Figure 10:
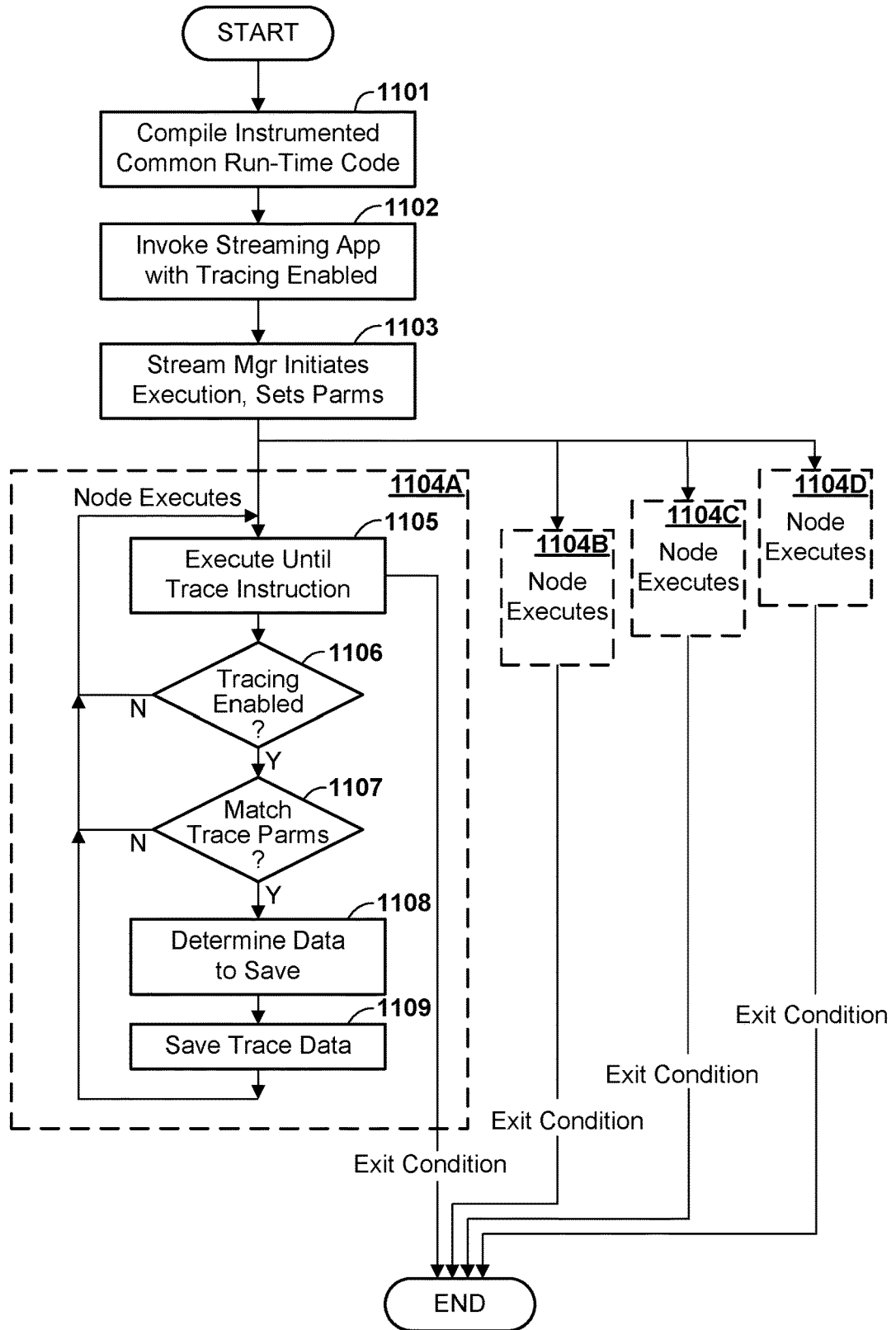
FIG. 10 is a flow diagram illustrating at a high level a process of collecting profile data for a data streaming application, according to various embodiments.

FIG. 10 is a flow diagram illustrating at a high level a process of collecting profile data for a data streaming application, according to various embodiments. Referring to FIG. 10, the instrumented code is compiled by compiler 136 (block 1001). Compilation represented at block 1001 could be either static or dynamic compilation. If statically compiled, the user would direct compilation with instrumentation at compile time, by specifying use of an appropriate instrumented version of the common run-time code, or if supported, by a special compiler directive or option to use the instrumented version. If dynamically compiled at run time, the user invoking execution of the data streaming application specifies the code files (e.g., source or intermediate code) including any instrumented version of the common run-time code. Responsive to the appropriate directive, compiler 136 compiles the data streaming application (either statically or dynamically, as the case may be) to incorporate the tracing instructions.

The data streaming application is invoked for execution with tracing enabled, and any optional tracing parameters are specified (block 1002). Although block 1002 is represented in FIG. 10 as following block 1001, is will be understood that in certain dynamic compilation environments, compilation may occur after the data streaming application is invoked for execution.

In one or more embodiments, the instrumentation instructions, being in the common run-time code, are not specific to any particular data streaming application and therefore not specific to any particular type of tuple or set of tuple types. For example, a common run-time routine which sends a tuple from one processing element to a next processing element could include a tracing instructions which trigger whenever a tuple (of any type) is sent. If the user wishes to trace a particular type of tuple or set of tuple types, the user specifies the tuple(s) to be traced as an optional tracing parameter when the data streaming application is invoked. When the trace instructions are triggered, the code determines whether the tuple being operated on by the corresponding common run-time routine is of the type which should be traced, and saves trace data accordingly. Additional run-time tracing options are possible. For example, it may be desirable to trace only some if the possible traceable events or paths through the operator graph. While generic trace instructions may exist in the common run-time code making it possible to trace all paths through the operator graph, the user may specify particular paths to be traced or otherwise limit the events to be traced.

Accordingly, when the data streaming application is invoked for execution at block 1002, the user may specify any tracing parameters. The user may have the option to disable tracing entirely for performance reasons. To collect trace data for use in analyzing the execution profile of the data streaming application and generating operator graph profile data 525 including profile lookup event data 526, tracing is preferably enabled and trace data for one or more tuple types of interest is saved whenever a lookup event occurs, a tuple of the corresponding type is created, is sent from one processing element to another, or is output to the database. Additional events may optionally be traced. At least initially, it would typically be expected that all lookup events would be traced along with the creation or transmission of corresponding tuples. But after a data streaming application has been previously profiled, a user may wish to trace particular lookup events which are known to be of interest.

Stream manager 134 responds by initiating execution in the various compute nodes 110 and initializing any environmental parameters, including environmental parameters governing tracing (block 1003). For example, a trace enable flag may be set, and bit masks or other data structures may be initialized to control tracing for the desired events to be traced, trace data to be collected, and so forth.

The data streaming application executes concurrently in each of the compute nodes 110 and in the management system 105, represented in FIG. 10 as blocks 1004A-D. Actions within each node or management system are illustrated only in block 1004A for clarity of representation, it being understood that these are similar in blocks 1004B-D. Within each node (or management system), the data streaming application code executes, possibly in multiple concurrent threads (represented in simplified form as block 1005), until a trace instruction is encountered. The trace instruction causes a check whether tracing is enabled (block 1006). If not, the 'N' branch is taken from block 1006, and execution resumes. If tracing is enabled, trace code determines whether the event and the current state data match the tracing parameters which were specified when execution was invoked (block 1007). For example, if particular events such as a lookup operation, tuple creation, and/or tuple transmission from one processing element to another, the trace code verifies that the trace instruction causing temporary halt in execution came from one of these events; if tracing of a particular tuple type was specified, the trace code verifies that the tuple associated with the trace event is of the specified type; and so forth. If the event/state data do not match the specified tracing parameters, the 'N' branch is taken from block 1007, and execution resumes; otherwise, the 'Y' branch is taken, and the trace code determines the extent of trace data to be saved (block 1008). Almost any data could be saved in a trace, but in one or more embodiments, the saved trace data includes a copy of the tuple associated with the traceable event and the location in the operator graph at which the tuple was at the time of the traceable event. This data is then saved in the local trace data 318, or, if the trace instructions are executing in the management node, in management node trace data 527 (block 1009).

At some point, an exit condition is encountered during execution, causing execution of the program to end, as indicated by the flow line to the END block. Such an exit condition could be, e.g., completion of procession all data, an interrupt, an error condition, or other exit condition.

Profile trace data could be collected by tracing during one or multiple execution instances of the data streaming application and/or multiple time intervals during a single execution, and might be refined or periodically updated over time as more is learned about the behavior of the data streaming application or as changes to the application code or the data upon which it typically operates cause changes to the application's behavior.

Generation of Lookup Event Summary Data

In accordance with one or more embodiments, the collected profile data is analyzed using profile data analyzer 523 in management system 105 to produce a set of lookup event summary records 526. The lookup event summary records correlate antecedent lookup predictive events such as specific tuple types and/or tuple attribute values and or other state variables occurring at specific locations within the operator graph with subsequently occurring lookup events, and may further specify some measure of the probability or likelihood that the subsequent lookup event will actually occur and/or the time delay between the occurrence of the antecedent lookup predictive event and the subsequent lookup event.

As used herein, a "lookup event" is a retrieval of data outside the buffers and caches of the data streaming application, i.e. a retrieval from storage or a remote device, as a result of a current need for the data by an executing processing element of the data streaming application. This is similar to a page fault during execution of a conventional computer program, but is broader in the sense that it could include data accessed over a network. The lookup event necessarily takes considerable time to retrieve the required data, which may affect the performance of the data streaming application. Because the streamed data is held in the various buffers, the streamed data tuples themselves are automatically available to the processing element and are not retrieved in lookup events. The lookup event may be necessary to retrieve other data which is somehow necessary to process the tuples in the processing elements. The lookup event is therefore associated with a tuple, specifically, the tuple being processed by the processing element which triggered the lookup event, although the associated tuple itself does not need to be retrieved in the lookup event.

FIG. 11 is a conceptual illustration of the structure of an exemplary set of lookup event summary records 526, according to various embodiments. These records correlate antecedent lookup predictive events in the data streaming application with subsequently occurring lookup operations, and may be used, among other things, to trigger the initiation of a lookup operation responsive to an antecedent event which predicts it, before an actual need for the looked-up data is encountered in the executing data stream.

Referring to FIG. 11, the lookup event summary data 526 contains multiple records 1101, each record corresponding to a single pair of an antecedent lookup predictive event and a resultant lookup operation. The antecedent event is expressed as a tuple of a specified type, and optionally having one or more specified attribute values, occurring at a specified location in the operator graph, and optionally under one or more specified external state variable values. Each record 1101 in the lookup event summary data contains a trigger location field 1102 specifying the location in the operator graph at which the antecedent event (i.e., the presence of a particular tuple) occurs; an internal tuple type field 1103 specifying the type of tuple which is temporarily held at the corresponding location within the operator graph to constitute the antecedent event; an internal tuple count field 1104 specifying the number of internal tuples of the type specified in type field 1103 which were found in the trace data at the trigger location specified in trigger location 1102; and a number of lookup events field 1105 specifying the number of lookup events in the group of lookup events to which the lookup event summary record corresponds.

In one or more embodiments, each record 1101 further contains a lookup location field 1106 specifying the location in the operator graph at which the lookup operation is to occur, i.e. to which looked up data is to be loaded; and a lookup event descriptor 1108 defining the resultant lookup event. The lookup event descriptor may contain any data needed to define the particular lookup operation which results from the corresponding antecedent event, and may include, but is not necessarily limited to: a network path, device path, device identifier or similar identifying a storage device, network location, or other entity from which the looked up data is to be retrieved; a filename, address, and/or other data specifying a location of the data to be looked up within the entity from which the looked up data is to be retrieved; a number of pages or other measure of amount to data to be retrieved; a load destination specifying an address or other designator of a location to which the looked up data is to be loaded; and any other data which may be necessary to define the lookup operation.

Each record 1101 may optionally further contain delay parameters 1107 which collectively specify certain time delays regarding the lookup event, and may be used where appropriate to delay initiation of the data lookup operation during execution following detection of the antecedent lookup predictive event. Delay parameters 1107 may include one or more values specifying a time elapsed between the occurrence of the antecedent event and the need by the data streaming application for the data which is the subject of the specified data lookup operation, and one or more values specifying a time elapsed from the initiation of a data lookup operation until the retrieved data is available to the data streaming application. Alternatively, the delay parameters could be a combined value in which both of these quantities are combined to express a delay time between detection of a lookup predictive event and initiation of a data lookup operation. Any of these quantities within the delay parameters 1107 could be a single value or multiple values, e.g., a mean time interval and a standard deviation from that mean, and if a single value, could represent an average time elapsed, a minimum time elapsed, a minimum time elapsed of some predetermined portion of the lookup operations, or some other measure of time.

In one or more embodiments, the record further contains one or more key field identifiers 1109 (of which one is illustrated in FIG. 11), each specifying a key field within the internal tuple type specified in field 1103, and a variable number of key field specifics 1110 corresponding to each key field identifier, each specific specifying a corresponding minimum value 1111, a corresponding maximum value 1112, and a corresponding probability value 1113. The probability value 1113 expresses a probability that the subsequently occurring lookup event will occur given that the antecedent lookup predictive event occurs, where the antecedent event is a tuple of type specified in internal tuple type field 1103, at graph location 1102, having a keyfield value in keyfield 1109 within the range specified by minimum value 1111 and maximum value 1112. The probability value may be expressed as a floating point value between 0 and 1. Alternatively, the probability value may be stored as a pair of values, the probability value being derived as the quotient of the pair of values. For example, the pair of values may be two integers which represent a count of a number of subsequent lookup events and a count of a number of tuples of type IT (and optionally having particular parameters) found at the subject graph location.

In one or more further embodiments, the record 1101 may further include one or more external state variable identifiers 1114 (of which one is illustrated in FIG. 11), each specifying an external state variable (i.e. a variable external to the tuple), and a variable number of external state variable specifics 1115 corresponding to each external state variable, each such specific specifying a corresponding minimum value 1116, a corresponding maximum value 1117, and a corresponding probability value 1118. The probability value 1118 is similar to probability value 1113, and expresses a probability that the subsequently occurring lookup event will occur given that the antecedent lookup predictive event occurs, i.e., that a tuple of type specified in internal tuple type field 1103 is encountered, at graph location 1102, and the specified external state variable 1114 has a value within the range specified by minimum value 1116 and maximum value 1117. The probability value may be expressed in any manner stated above with respect to probability value 1113.

In one or more alternate embodiments, the key field 1109 and key field specifics 1110 and/or the external state variable identifier 1114 and external state variable specifics 1115 may be optional or not used. A single probability value may be specified for the antecedent internal tuple type and graph location, i.e., a single probability value regardless of the values of any data within the corresponding tuple. In one or more further alternative embodiments, probability values are not used, and it is assumed that if the antecedent event occurs, the subsequent lookup event will also be necessary.

The data collected by tracing may be analyzed in any of various ways to produce lookup event summary records 526. Conceptually, the analysis amounts to determining, for each subsequently occurring lookup event, for each location the tuple causing the lookup or a parent tuple thereof passed through in the operator graph, and for each internal tuple (or parent tuple) at that location, the number of such tuples at the location (antecedent events) and the number of subsequently occurring lookup events. Additionally, if one or more key fields and/or external state variables are identified, these numbers are broken down by range of values in the corresponding key field or external state variable. Additionally, once the antecedent events and subsequent lookup events are identified, one or more measures of delay (average, minimum, etc.) between the occurrence of the antecedent event and lookup event can be determined.

Figure 12:
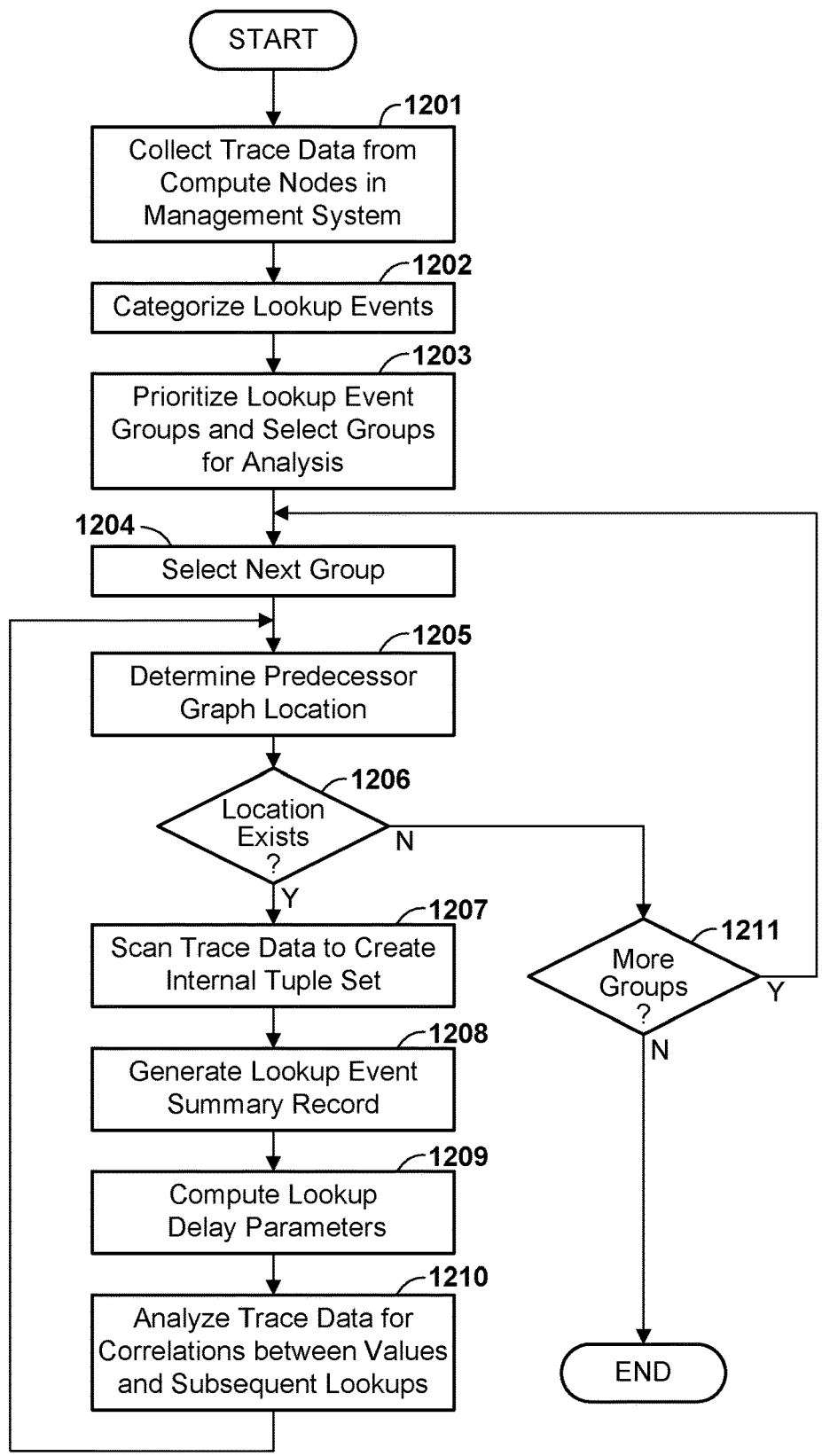
FIG. 12 is a flow diagram illustrating at a high level a process of analyzing profile data to produce a set of lookup event summary records, according to various embodiments.

FIG. 12 is a flow diagram illustrating at a high level a process of analyzing profile data to produce a set of lookup event summary records 526, according to various embodiments. This analysis is performed by or under the control of profile data analyzer 523 in management system 105.

Referring to FIG. 12, trace data collected in the various nodes and stored in respective local node trace data caches 318 of compute nodes 110 is transmitted to the management system 105 for analysis (block 1201). Collection of trace data in the management system is shown as a single block for simplicity of representation. It would in fact be possible to transmit all trace data to the management system at the beginning of analysis, as represented in FIG. 12. Alternatively, profile data analyzer 523 in management system 105 may request trace data in increments from the various compute nodes 110 as the analysis is performed. This latter approach would off-load some of the screening work to the compute nodes. For example, the management system may determine that only specific lookup events occurring at specific locations are of interest, and according request data pertaining only to those lookup events, thereby reducing consumption of network bandwidth during analysis, and reducing the burden on the management system of scanning a great deal of trace data which is ultimately not used.

The lookup events in the trace data are identified and categorized into groups according to the originating cause in the data streaming application and source of the looked up data (block 1202). In one or more embodiments, this means that lookup events generated by execution of the same processing element, on behalf of the same tuple type, and accessing the same external data source, are grouped together. The same "external data source" does not necessarily mean exactly the same data, for exactly the same data is unlikely to be looked up repeatedly, as it will in the normal course be maintained in some sort of cache. An external data source may, for example, be a very large data entity such as an external database, in which one or more attributes of the tuple being processed by the respective processing element are used to determine which data from the external data source is accessed. Among other things, the external data source could be database 140 or any particular table 821-823 thereof, or could be some other database or table thereof, or could be an array or other data structure in management system 105, any of compute nodes 110, or compiler system 102, or any other data accessible locally or over network 120. One or more attributes of the tuple being processed may be used to determine an address, a key value, an array index, or some other value which is used to identify the specific data within a larger external data source (database, array or other data structure) which is retrieved by the lookup operation.

In one or more optional embodiments, the groups of lookup events are prioritized and selected for analysis (block 1203). The lookup event groups may be prioritized according to some appropriate measure of adverse effect on performance of the data streaming application which is attributable to the corresponding category of lookup operations. For example, the groups may be prioritized according to total number of lookup operations in each group, or total cumulative time required to perform the lookup operations in each group, or some other measure of effect on performance. One or more groups are selected for analysis. In one embodiment, all groups having a performance impact exceeding some pre-determined threshold are selected. In another embodiment, groups having a performance effect in excess of some deviation from an average performance effect are selected. In another embodiment, only the group having the largest effect on performance is selected.

Analysis of groups of lookup events according to some measure of adverse effect on performance is intended to avoid analysis of and subsequent corrective actions for categories of lookup events having little or no effect on performance. For example, some types of lookup events may occur only rarely, as when some error condition is encountered. Attempts to predict such rarely occurring lookup events may be subject to considerable inaccuracy, and the overhead of doing so may exceed any performance benefit. However, in one or more embodiments, optional block 1203 is not performed, and all groups of lookup events are analyzed.

A next group from among those prioritized for analysis is then selected as the current group to be analyzed (block 1204). For each location in the operator graph, the trace data is analyzed to produce a set of one or more lookup event summary records 1101 corresponding to the group of lookup events selected for analysis. This is represented in FIG. 12 as blocks 1205-10. A "location" can be any subset of the operator graph in the data streaming application in which tuples might be temporarily held and at which they are traced. In one or more embodiments, the "locations" are processing elements in the operator graph, and are so described herein, it being understood that the granularity of locations could be compute nodes, operators, or some other entity.

Since each group corresponds to a particular category of lookup event, the corresponding lookup events necessarily occur at a particular processing element in the data streaming application on behalf of a particular tuple type. The profile data analyzer accesses the operator graph data to determine a predecessor processing element in the operator graph from which the tuple type which caused the lookup event (or a parent of that tuple type) came (block 1205). I.e., it traverses the operator graph backwards. If such a predecessor exists (the 'Y' branch from block 1206), it is selected as the current processing element for analysis. For simplicity of description, it is assumed herein that, for each processing element at which such a tuple type is present, there is only one such predecessor processing element, although it is in fact possible that multiple predecessor processing elements exist, in which case each such processing element is analyzed in turn.

The profile data analyzer scans the trace to identify all occurrences of the corresponding tuple type (or parent thereof) in the current processing element (block 1207); these form a current set of internal tuples. A corresponding lookup event summary record 1101 is generated for the current processing element and lookup event group (block 1208). The trigger location 1102 of the lookup event summary record is the current processing element; the internal tuple type 1103 is the corresponding tuple type (or parent thereof) in the current processing element, the internal tuple count 1104 is the number of tuples found in the trace; the number of lookup events 1105 is the number of lookup operations in the current group of lookup operations; the lookup location 1106 is the processing element at which the lookups in the current group occur, and the lookup event descriptor 1108 is a descriptor containing the identifying parameters of the lookups of the current group. The ratio of the number of internal tuples (field 1104) to the number of lookup events (field 1105) yields an approximate probability that, upon encountering a tuple of the specified type at the trigger location during execution, a subsequent lookup event of the category of lookup events which form the current group of lookup events will be necessary.

In one or more embodiments, the trace data is analyzed to determine one or more delay parameters 1107, which are added to the lookup event summary record 1101 (block 1209). The delay parameters may be used to delay, in appropriate circumstances, initiation of a lookup event after detection of the antecedent lookup predictive event during execution. Ideally, the delay after detection of the antecedent lookup predictive event would be just sufficient to cause the looked up data to become available immediately before it is needed by the lookup location's processing element. This can be determined as a function of the time interval between occurrence of the antecedent lookup event (i.e., the tuple traced in the applicable trigger location) and the beginning of the lookup operation (indicating need for the data), less the time required to perform the lookup operation. In many cases, the latter time may exceed the former time interval, indicating that the data lookup operation should commence as soon as the antecedent lookup predictive event is detected. Since these time intervals will not necessarily be uniform, the trace data may be analyzed to determine some measure of typical or average behavior, such as a mean time interval and a standard deviation thereof, and both the interval between antecedent event and lookup event, and the time required for data lookup, may be separately measured. It may alternatively be possible to obtain measurements of average lookup operation time from some other source, such as performance monitoring statistics.

In one or more embodiments, the trace data is analyzed to identify any correlations between particular attribute values in the tuple and/or external state variable values and a subsequent lookup event for that same tuple (block 1210). If a correlation is found between an attribute value in the tuple and the subsequent lookup event, a keyfield 1109 and one or more associated key field specifics 1110 may be appended to the lookup event summary record generated at block 1208. Similarly, if a correlation is found between an external state variable value and the subsequent lookup event, an external state variable identifier 1114 and one or more associated external state variable specifics may be appended to the lookup event summary record.

Specifically, it is desirable to know whether, for any values of any key attribute field in the internal tuples of the corresponding internal tuple type or for any external state variable values, the probability of a subsequent lookup operation in the current group of lookup operations being performed is substantially different than for the set of internal tuples of the same tuple type as a whole (i.e, the ratio of number of tuples field 1104 to number of lookup events field 1105). The key field(s) and/or external state variable(s) could be specified by some external command to the stream manager, or could be determined by the profile data analyzer 523 by analyzing the trace data. Specifically, any of various analytical techniques or tools could be used for finding correlations in data.

If such a key field or external state variable and corresponding value ranges are identified, the key field/external state variable is saved as key field 1109 or external state variable ID 1114 in the lookup event summary record 1101, and each value or range of values of interest, and their corresponding lookup event probabilities, are saved as a respective key field specific 1110 or external state variable specific 1115 having a respective minimum value 1111 or 1116, a respective maximum value 1112 or 1117, and a respective lookup event probability 1113 or 1118. The probability reflects the probability that, given a tuple occurring in the trigger location and having a key field value in the corresponding range (or under conditions when an external state variable is in the corresponding range), a lookup event of the current group of lookup events will subsequently be required for the same tuple.

In one embodiment, a key field 1109 or external state variable ID 1114 is saved in the lookup event summary record 1101 (along with corresponding key field specific 1110 or external state variable specific 1115) only for those values for which the corresponding lookup event probability is significantly greater than the lookup event probability for the set of internal tuples of the same tuple type as a whole. In an alternative embodiment, a key field 1109 or external state variable ID 1114 is saved in the lookup event summary record 1101 (along with corresponding key field specific 1110 or external state variable specific 1115) for those values for which the corresponding lookup event probability is significantly different (whether greater or less than) the lookup event probability for the set of internal tuples of the same tuple type as a whole. In another alternative embodiment, if the lookup event probability for the set of internal tuples of the same tuple type as a whole is sufficiently large, indicating that the corresponding data should always be looked up when the tuple is encountered at the trigger location, block 1210 may be skipped, and no key fields 1109 or external state variable IDs 1114 (along with corresponding key field specific 1110 or external state variable specific 1115) are appended to the lookup event summary record 1101

After delay parameters have been computer (block 1209) and trace data analyzed for correlations between specific attribute/external variable values and subsequent lookups (block 1210), the analyzer returns to block 1205 to determine another predecessor location in the graph.

If, at block 1206, no predecessor processing element exists, the operator graph has been traversed all the way back to creation of the corresponding tuple, and the 'N' branch is taken from block 1206, indicating that the corresponding group of lookup events has been analyzed. In this case, if any more selected groups of lookup events remain to be analyzed, the 'Y' branch is taken from block 1211 and a next group is selected at block 1204. When all groups have been thus analyzed, the 'N' branch is taken from block 1211, and analysis of profile data is complete.

It will be appreciated that in the above description and the illustration of FIG. 12, various actions are shown and described as being performed sequentially for ease of understanding. However, for greater system efficiency, it may be possible to perform many of these actions concurrently by combining multiple scans of trace data into a single scan. It will further be understood that the order of certain actions could be changed without affecting the result of generating profile summary records. Finally, it will be appreciated that many variations in the form of profile data used to analyze lookup events and antecedent lookup predictive events are possible, and that the lookup event summary records described herein represent only some of the possible forms of profile data which may be used. Profile records may have other or additional fields; may be based on data other than or in addition to trace data; may characterize data streaming application behavior in a different way; and so forth.

Early Lookup Operations During Execution

In accordance with one or more embodiments, a respective trigger is inserted at one or more trigger locations each identified by a corresponding lookup event summary record. Encountering the trigger during execution either is a lookup predictive event or causes verification of a lookup predictive event in accordance with parameters specified in the applicable lookup event summary record and/or data derived therefrom. In response to detecting a lookup predictive event, a lookup operation is performed in advance of actual demand for the looked up data, and the looked up data provided to a buffer or cache accessible by the processing element which is predicted to require it. The lookup operation may be delayed beyond the first indication of a lookup predictive event if delay data indicates that delay is feasible without causing the processing element which is predicted to require the looked up data to wait for the data.

In one or more embodiments, upon initiation of a data streaming application and/or from time to time thereafter, stream manager 134 accesses lookup event summary records 526 to generate lookup mask 521 and one or more trigger parameter datasets 522 in management system 105. Local copies of the lookup mask are lookup and trigger parameter datasets are then transmitted to the various compute nodes 110. The local copies of these data structures are intended to be state data structures which are maintained in compute node memory 300 and govern the execution of the various processing elements 311 in compute nodes 110.

Figure 13:
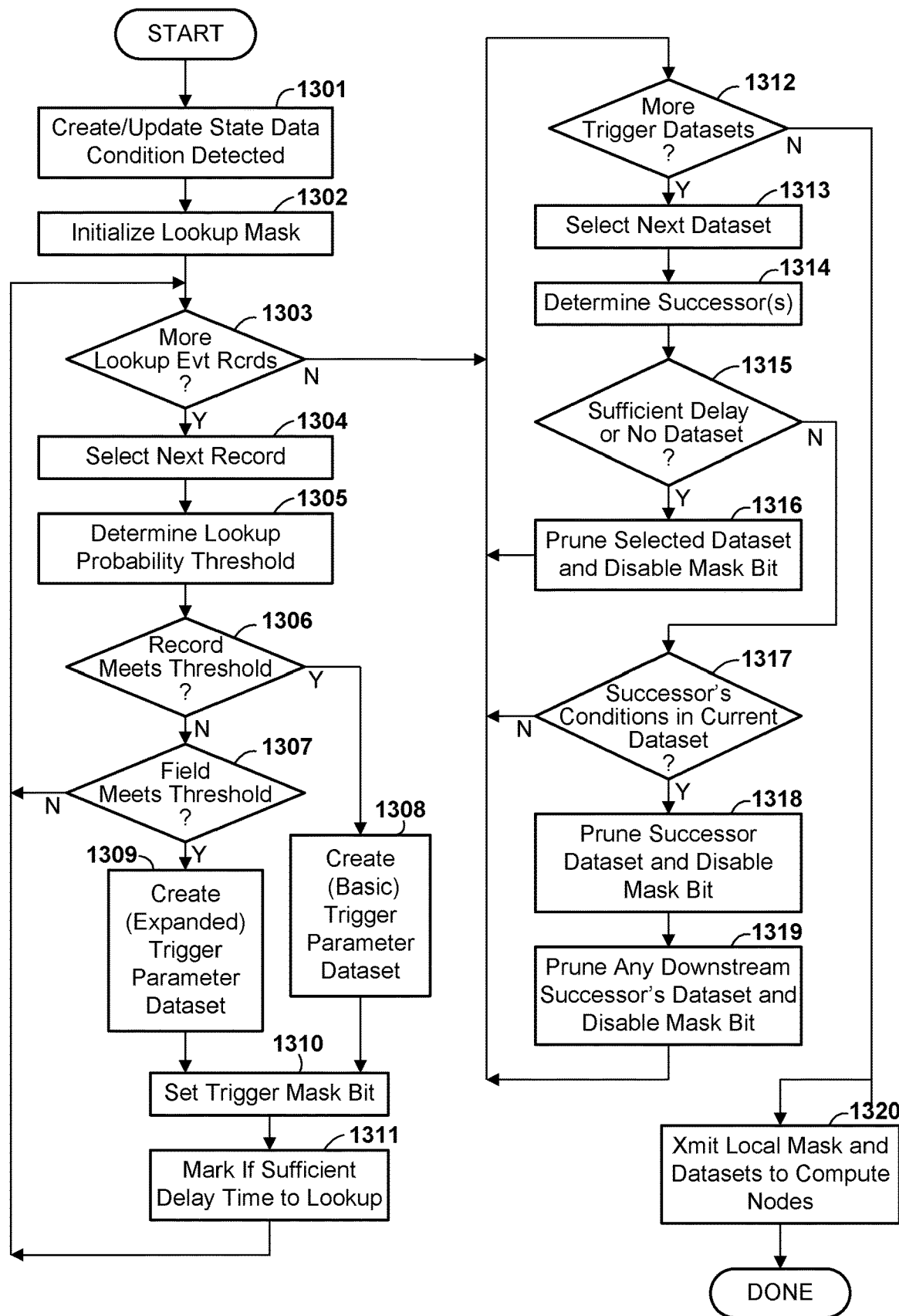
FIG. 13 is a flow diagram illustrating at a high level a process of generating or updating state data structures which govern lookup operations during execution, according to various embodiments.

FIG. 13 is a flow diagram illustrating at a high level a process of generating or updating state data structures which govern lookup operations during execution, according to various embodiments. Referring to FIG. 13, stream manager 134 detects a condition for initializing/updating state data which governs anticipatory lookup operations during execution of the data streaming application (block 1301). The condition might be an initialization of the data streaming application. Alternatively, the state data may be updated from time to time to account for changes to system configuration, workload changes, for performance tuning, and so forth. This could be done according to a fixed schedule, and/or when certain events which may indicate a need for it are detected, such as an alteration of system configuration. The stream manager would not necessarily detect such a condition itself, but may simply receive an external command to reset or update the lookup state data.

Upon detection of the appropriate condition, stream manager accesses operator graph 132 to initialize lookup mask 521 (block 1302). The lookup mask is initialized with all processing elements or other entities disabled. In one or more embodiments and as described herein, both the lookup mask and the lookup event summary records have a granularity of a processing element, i.e., a separate mask bit exists for each processing element, and a separate lookup event summary record exists for one or more processing elements. However, it will be understood that the granularity of the mask and/or lookup event summary records could be different. For example, there could be a separate mask bit for each operator within a processing element and/or separate lookup event summary records for at least some of the operators If any lookup event summary records 526 have not been selected (the 'Y' branch from block 1303), the stream manager selects and retrieves a next lookup event summary record (block 1304).

Stream manager 134 determines a predictive lookup probability threshold to be used for deciding whether to perform an anticipatory lookup for the current lookup event summary record (block 1305). A lookup operation should be performed if the predicted probability of need for the data exceeds the threshold. In one or more embodiments, the threshold could vary depending on a number of dynamic factors, and therefore is determined at run time. These factors may include any or all of: (a) a current level of activity, and particularly I/O activity on the I/O channel to be used in the lookup, where a higher current level of activity indicates greater overhead cost of the anticipatory lookup operation and therefore a higher threshold; (b) an amount of data to be retrieved by the lookup, which again relates to the overhead cost of the lookup, a greater amount of data indicating a higher threshold; (c) a size of buffer memory in the buffer to receive the looked up data, the smaller buffer size indicating a higher threshold due to the greater likelihood of buffer contention; and (d) a length of time to perform the lookup operation, the longer lookup time indicating a greater cost for failing to look up data which is actually needed, and hence a lower threshold. Other or additional factors could be used. It will be observed that, due to these dynamic factors, the probability threshold may be different for different lookup operations, and may vary with time for the same lookup operation. However, in one or more alternative embodiments, a fixed probability threshold is used, making block 1305 unnecessary.

The stream manager then determines whether the lookup probability threshold is met for the selected lookup event summary record 1101 (block 1306). In this case, the lookup probability for the record is the ratio of the number of lookup events 1105 to the number of internal tuples 1104, representing an approximate probability that, given an occurrence of an internal tuple of the corresponding internal tuple type 1103 at trigger location 1102, a subsequent lookup operation will be necessary. If this ratio exceeds the lookup probability threshold previously determined, the 'Y' branch is taken from block 1306, and a corresponding trigger parameter dataset is created (block 1308).

The trigger parameter dataset created at block 1308 is an abbreviated version of data in the lookup event summary record 1101, containing only what is necessary to manage anticipatory lookup operations during run time. Since the stream manager has already determined that a probability threshold is met, it is unnecessary for the trigger parameter dataset created at block 1308 to contain probability data, key fields or key field specifics, external state variable Ids or external state variable specifics. The existence of the dataset is an indication that the corresponding anticipatory lookup operation should be performed. The stream manager then continues to block 1310.

If, at block 1306, the lookup probability for the record does not exceed the lookup probability threshold, the 'N' branch is taken from block 1306. In this case, any key field specific 1110 or external state variable specific 1115 in the lookup event summary record 1101 is examined to determine whether the corresponding probability 1110 or 1115 exceeds the threshold. Such a probability exceeding the lookup probability threshold indicates that, although the occurrences of a random tuple of the type specified in internal type field 1103 at trigger location 1102 does not indicate a sufficiently high probability of a subsequent lookup event, if the key field and/or external state variable have corresponding value within the range specified in the applicable key field specific 1110 or external state variable specific 1115, then the probability of a subsequent lookup event does indeed meet the threshold, and an anticipatory lookup operation should be performed. Accordingly, the 'Y' branch is taken from block 1307, and a corresponding trigger parameter dataset is created (block 1309).

In an embodiment, compound conditions may be evaluated at block 1306 if no single key field or external state variable specific meets the lookup probability threshold. For example, even if two separate conditions of respective different key fields or external state variables do not individually meet the lookup probability threshold, an estimate of lookup probability for a logical AND of the two conditions can be made from individual probability data (e.g., counts of number of antecedent events and number of subsequent lookups required), and compared to the lookup probability threshold.

The trigger parameter dataset created at block 1309 is similar to that created at block 1308, but contains additional data to specify the applicable key field and/or external state variable condition or conditions. As in the case of the trigger parameter dataset created at block 1308, it is not necessary to specify the actual probabilities in the trigger parameter dataset, only the condition(s) which meet the lookup probability threshold. There could be multiple conditions, which could be specified as multiple logical ORs, where each logical condition may comprise one or more logically ANDed conditions. The stream manager then continues to block 1310.

At block 1310, the corresponding mask bit in lookup mask 521 is then enabled for the location identified in trigger location field 1102 of the selected lookup event record 1101. This mask bit enables triggering of the lookup operation during execution.

In one or more embodiments, the stream manager further uses delay parameters 1107 to determine whether a sufficient delay time interval exists between the time that a tuple of the type identified in internal tuple field 1103 is encountered in the trigger location 1102 (the antecedent lookup predictive event) and the subsequent lookup operation for the lookup operation to be performed (block 1311). I.e., assuming an anticipatory lookup operation is initiated immediately upon detecting the tuple at the trigger location, will the lookup operation complete by the time the tuple needs the lookup up data in the lookup location identified in field 1106. Since historical lookup times and streaming delay times will vary, the delay parameters preferably provide sufficient data to make a projection to some desired degree of confidence. For example, a mean and standard deviation of delay times and lookup times might be provided, so that the delay time interval is considered "sufficient" if some percentage of the lookup operations (e.g. 90%) complete on time. If the delay time is considered sufficient, the trigger parameter record is so marked. This determination is used to prune certain premature trigger parameter datasets as explained with respect to blocks 1312-1319 below. The stream manager then returns to block 1303 to select a next record.

If, at block 1307, none of the key field specifics or external state variable specifics (or combinations thereof) indicates a lookup probability in excess of the lookup probability threshold, the 'N' branch is taken from block 1307. In this case, the lookup mask is unaltered (i.e., remains disabled for the corresponding trigger location), and no corresponding trigger parameter dataset is created. As a result, during execution, no lookup will be performed from the current trigger location 1102. The stream manager then returns to block 1303 to consider the next lookup event record.

When all lookup event records have been thus examined and processed, the 'N' branch is taken from block 1303. The stream manager then prunes certain redundant or premature trigger parameter datasets and disables the corresponding mask bits, shown as blocks 1312-1319.

Pruning is performed to improve execution efficiency by reducing triggering of lookup operations. Where a given type of internal tuple passes through multiple processing elements before requiring data to be looked up, it is possible that more than one of these processing elements, and perhaps all of them, have corresponding lookup event records which meet the lookup probability threshold, and consequently corresponding bits in the trigger mast are enabled and trigger parameter datasets created. Absent pruning, the result would be to trigger anticipatory lookup at each of the multiple processing elements during execution (although other mechanisms, such as I/O operation queues, may avoid duplicate operations being performed). This has two undesirable effects. First, in some cases, a lookup operation may be triggered earlier than necessary in a first processing element, when waiting until the tuple reaches a second processing element downstream of the first might reduce the number of lookup operations (due to changes/deletions of tuples) and/or make the looked up data more current. Second, a lookup may be triggered multiple times in different processing elements for the same data.

The stream manager reviews the trigger parameter datasets for possible pruning. This could be done in any order, although some orders (e.g. traversing the operator graph backwards) may be more efficient. If there are any more trigger parameter dataset which have not been selected for pruning analysis (the 'Y' branch from block 1312), the stream manager selects a next dataset (block 1313).

The immediate successor(s) processing element of the selected dataset in the operator graph is/are identified (block 1314). The "immediate successor(s)" is/are the processing element(s) which next receive the internal tuple of type identified in the selected dataset. Often, there will be only one immediate successor, although there could be multiple successors, indicating a branch in the operator graph data flow. If, for all immediate successors, the delay time interval between the occurrence of the lookup predictive tuple in the corresponding processing element and the subsequent lookup event is greater than the time required to perform the lookup (as determined previously at block 1311), or there is no corresponding trigger parameter dataset (indicating low probability of lookup for a particular path), then the 'Y' branch is taken from block 1315, and the currently selected trigger parameter dataset is pruned and the corresponding mask bit in trigger mask 521 is disabled (block 1316).

Pruning is appropriate because the lookup operation can wait to be performed in a successor processing element. After pruning, stream manager returns to block 1312 to select a next trigger parameter dataset.

If, at block 1315, an immediate successor does not have sufficient delay time interval to perform the lookup operation, then the 'N' branch is taken. In this case, the currently selected dataset is not pruned because the lookup should be performed at least as early as the processing element corresponding to the currently selected dataset. If an immediate successor's trigger parameter dataset does not contain conditions which are included in the conditions of the currently selected trigger parameter dataset (i.e., contains a new condition which is not necessarily triggered by the current trigger parameter dataset), the 'N' branch is taken from block 1317, and a next trigger parameter dataset is selected at block 1312. If an immediate successor's trigger parameter dataset contains conditions which are included in the conditions of the currently selected trigger parameter dataset, then 'Y' branch is taken from block 1317, and the successor's trigger parameter dataset is pruned and the corresponding mask bit in trigger mask 521 is disabled (block 1318). The reason for doing so is that any lookup performed by the successor will be duplicative of the lookup performed by the currently selected trigger parameter dataset. All downstream successors of the pruned immediate successor are identified and, if they similarly contain conditions which are included in the conditions of the currently selected trigger parameter dataset, they are similarly pruned and the corresponding mask bit in trigger mask 521 is disabled as well (block 1319). The stream manager then returns to block 1312 to select a next trigger parameter dataset.

When all trigger parameter datasets have been thus reviewed and pruned as necessary, the 'N' branch is taken from block 1312. The stream manager then transmits local copies of the trigger mask 521 and trigger parameter datasets 522 to each compute node (block 1320, where they are stored as local trigger mask 321 and local trigger parameters datasets 322, respectively. The local copies containing only the mask bits/datasets needed by the receiving compute node. The process of generating/updating state data structures governing lookup operations at run time then ends.

Figure 14:
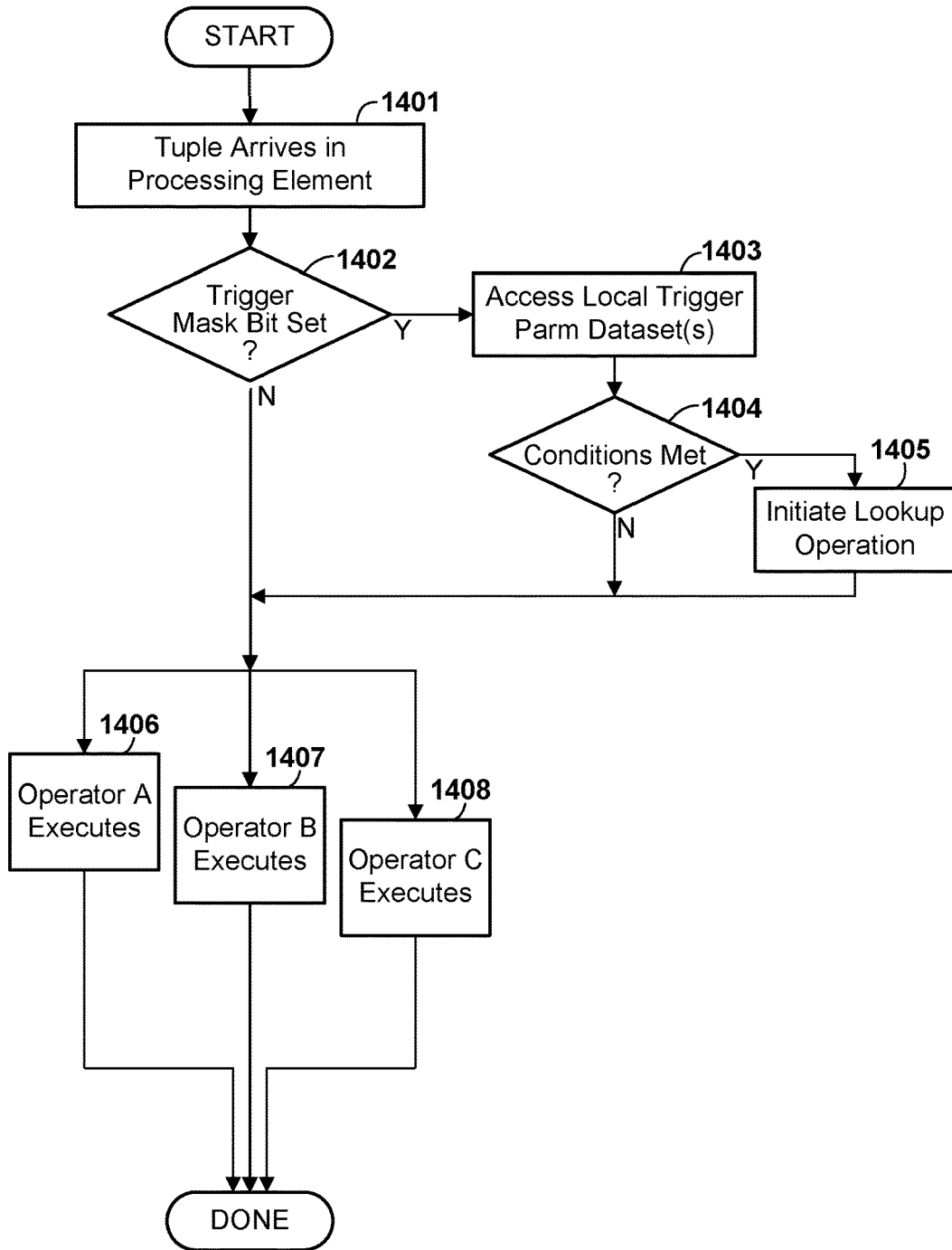
FIG. 14 is a flow diagram illustrating an execution process of an exemplary processing element of a data streaming application, according to various embodiments.

After initialization, the data streaming application executes in each processing element as data (in the form of tuples) arrives in the processing element, and uses the local trigger mask 321 and local trigger parameter datasets 322 to identify appropriate conditions for triggering anticipatory lookup operations. FIG. 14 is a flow diagram illustrating an execution process of an exemplary processing element 311 of the data streaming application, in which the processing element may in appropriate cases trigger an anticipatory lookup operation using the local trigger mask 321 and local trigger parameter datasets, according to various embodiments.

Referring to FIG. 14, a tuple traversing the operator graph arrives in the exemplary processing element for processing (block 1401). Anticipatory lookup instructions 616 in the common run-time code 614 which are executed upon entry to the processing element check the local trigger mask 321 (block 1402). Although this check is illustrated in FIG. 14 and described herein as being performed upon entry to the processing element, it will be understood that it could alternatively be performed on exit or at any location in the processing element's code which will always execute.

If the corresponding trigger bit is set, the 'Y' branch it taken from block 1402, and lookup instructions 616 access the local trigger parameter dataset(s) 322 to find any datasets for which the trigger location is the current processing element (block 1403). It is possible that there could be more than one such dataset, i.e., more than one lookup operation triggered from the same processing element. The trigger parameter dataset specifies the condition or conditions of triggering. If any of the conditions is met, the 'Y' branch is taken from block 1404, and the lookup instructions 616 use the lookup descriptor data in the trigger parameter dataset and/or additional data available (e.g., from the tuple) to initiate a lookup operation (block 1405). This may be, e.g., by addressing an address in storage defined by the lookup descriptor, by transmitting a request over a network to an entity defined by the lookup descriptor for data defined by the lookup descriptor, or otherwise. If none of the conditions is met, the 'N' branch is taken from block 1404 and block 1405 is by-passed.

The processing element then continues to execute on the tuple. In this exemplary embodiment, the processing element calls operators A, B and C, illustrated as blocks 1406-1408. Operators could be executed sequentially or in parallel, and the number of operators may vary. When all operators have finished executing, processing of the tuple is complete.

In the various embodiments described above, it is possible that the same lookup operation will be performed multiple times for the same data before the actual need arises. Although an attempt to prune redundant trigger parameter datasets which may cause redundant lookup operations is described with respect to FIG. 13, pruning can not always guarantee that there will be no redundant lookups. Other mechanisms beyond the scope of the present disclosure may reduce the number of redundant lookup operations. For example, an operating system may maintain a record of storage access operations in progress, from which it can prevent redundant accesses to the same storage location. In the worst case, there may be some redundant lookup operations causing a small additional utilization of storage channels, network bandwidth, or the like.

Alternative Lookup Predictive Events

In various embodiments described above, a lookup predictive event is the occurrence of a tuple of specified type in a specified location in the operator graph. In some cases, the occurrence of the tuple alone is a sufficient condition to trigger a lookup operation. In others, in addition to the occurrence of the tuple, one or more tuple attributes and/or external state variables must satisfy specified conditions to trigger the lookup operation.

However, in one or more alternative embodiments, the lookup operation need not be triggered by a particular tuple type at a particular operator graph location, but by other conditions which might be detected during execution. For example, prediction of need for data may be based at least in part on historical data retrieval patterns of the data streaming application. Such historical patterns could include any or all of (a) time of day/week a data element is typically retrieved; (b) time after occurrence of a particular event; (c) existence of certain conditions; or (d) correlation with other data retrievals. Any or all of these historical data patterns might be detected by analysis of profile data, and appropriate data structures and/or triggering mechanisms could be used to trigger the lookup operations responsive to the antecedent lookup predictive event.

Other Variations

Although a series of steps has been described above as one or more preferred and/or alternate embodiments, it will be appreciated that many variations of a technique for reducing delays in a data streaming application caused by lookup operations are possible. In particular, some steps may be performed in a different order, different data structures may be used, and/or different hardware or software resources may be employed to perform functions described herein. Furthermore, although certain formulae, thresholds, logical conditions, and so forth may have been disclosed as one or more embodiments, it will be appreciated that these formulae, thresholds, logical conditions, etc., and variations thereof are only some of the possible embodiments, and that other techniques could alternatively be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. Examples of a computer readable storage medium are illustrated in FIG. 2 as system memory 202 and data storage devices 225-227. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Unless inconsistent with the invention or otherwise qualified herein, computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A non-transitory computer-readable media having recorded thereon a computer program having a plurality of computer-executable instructions, wherein the computer program, when executed by at least one computer system, causes the at least one computer system to perform actions comprising:
using lookup predictive profiling data to identify at least one lookup predictive event occurring during execution of a data streaming application, each lookup predictive event predicting respective data which will need to be retrieved by a respective processing element of said data streaming application;
responsive to detecting, during a current execution instance of said data streaming application, the occurrence of a lookup predictive event identified by said using lookup predictive profiling data to identify at least one lookup predictive event, initiating retrieval, during the current execution instance of said data streaming application, of the respective data which the respective lookup predictive event predicts will need to be retrieved by a respective processing element of said data streaming application, wherein said initiating retrieval of the respective data is performed before the respective processing element determines a need for the respective data,
wherein said lookup predictive profiling data comprises data obtained by collecting trace data from at least one execution instance of said data streaming application, and analyzing the collected trace data to produce lookup predictive profiling data.

2. The non-transitory computer-readable media of claim 1, wherein said lookup predictive event comprises a tuple of specified type detected at a specified location in an operator graph of said data streaming application.

3. The non-transitory computer-readable media of claim 2, wherein said lookup predictive event further comprises at least one of: (a) an attribute value within a specified range, the attribute being an attribute of the tuple of specified type detected at the specified location in the operation graph, and (b) a value of at least one external state variable.

4. The non-transitory computer-readable media of claim 1, wherein the computer program, when executed by at least one computer system, further causes the at least one computer system to perform actions comprising:
determining, for each of the at least one lookup predictive event occurring during execution of the data streaming application, whether a respective lookup operation may be delayed after detection of a corresponding lookup predictive event.

5. A data processing apparatus supporting execution of a data streaming application, comprising:
at least one physical processor;
at least one physical memory;
a data streaming application embodied as instructions executable on the at least one processor and storable in the at least one memory, the data streaming application implementing an operator graph having a plurality of processing elements which operate on data tuples being transferred among processing elements of the plurality of processing elements;
an anticipatory lookup function embodied as instructions executable on the at least one processor and storable in the at least one memory, wherein the anticipatory lookup function detects at least one lookup predictive event occurring during processing of a respective tuple in a respective antecedent processing element, each lookup predictive event predicting respective data which will need to be retrieved by a respective subsequent processing element of said data streaming application processing the respective tuple after the antecedent processing element processes the respective tuple, and responsive thereto, initiates retrieval of the respective data which the respective lookup predictive event predicts will need to be retrieved by the respective subsequent processing element of said data streaming application before the respective tuple is processed by the respective subsequent processing element; and
a profile data analytic function embodied as instructions executable on the at least one processor and storable in the at least one memory, a wherein said profile data analytic function analyzes trace data collected from at least one execution instance of said data streaming application to produce lookup predictive profiling data, said anticipatory lookup function using said lookup predictive profiling data to identify the at least one lookup predictive event.

6. The data processing apparatus of claim 5, wherein said lookup predictive event comprises a tuple of specified type detected at a specified location in an operator graph of said data streaming application.

7. The data processing apparatus of claim 6, wherein said lookup predictive event further comprises at least one of: (a) an attribute value within a specified range, the attribute being an attribute of the tuple of specified type detected at the specified location in the operation graph, and (b) a value of at least one external state variable.

8. The data processing apparatus of claim 6, comprising:
a plurality of computer systems each having a respective at least one physical processor and a respective physical memory;
at least one network supporting communication of data among said plurality of computer systems; and
wherein each computer system of said plurality of computer systems embodies at least one respective node of said data streaming application.

9. The data processing apparatus of claim 8,
wherein said plurality of computer systems include a management system supporting executing of a stream manager; and
wherein said stream manager generates data identifying lookup predictive events for use by said anticipatory lookup function.

10. A non-transitory computer-readable media having recorded thereon a computer program having a plurality of computer-executable instructions, wherein the computer program, when executed by at least one computer system, causes the at least one computer system to perform actions comprising:
accessing profiling data with respect to a data streaming application having a plurality of processing elements, the profiling data being collected from one or more time intervals during execution of said data streaming application;

using the profiling data to identify a lookup predictive event occurring during execution of said data streaming application, the lookup predictive event predicting lookup data which will need to be obtained by a first processing element of said data streaming application during a current execution instance thereof;

detecting occurrence of the lookup predictive event during the current execution instance of said data streaming application, the lookup predictive event being detected in a second processing element of said data streaming application, the second processing element being upstream of the first processing element;

responsive to detecting occurrence of the lookup predictive event during the current execution instance of said data streaming application, initiating retrieval of the lookup data to the first processing element, wherein said profiling data comprises data obtained by collecting trace data from at least one execution instance of said data streaming application, and analyzing the collected trace data to produce said profiling data.

11. The non-transitory computer-readable media of claim 10, wherein said lookup predictive event comprises a tuple of specified type detected at the second processing element.

12. The non-transitory computer-readable media of claim 11, wherein said lookup predictive event further comprises at least one of: (a) an attribute value within a specified range, the attribute being an attribute of the tuple of specified type detected at the second processing element, and (b) a value of at least one external state variable.

13. The non-transitory computer-readable media of claim 10, further comprising:

determining, for each of the at least one lookup predictive event occurring during execution of said data streaming application, whether a respective lookup operation may be delayed after detection of a corresponding lookup predictive event.

\* \* \* \* \*